United States Patent
Yang et al.

(10) Patent No.: US 11,864,230 B2
(45) Date of Patent: *Jan. 2, 2024

(54) METHOD AND APPARATUS FOR TRANSMITTING AND RECEIVING SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Sechang Myung, Seoul (KR); Duckhyun Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,693

(22) Filed: Jan. 12, 2023

(65) Prior Publication Data

US 2023/0156791 A1  May 18, 2023

Related U.S. Application Data

(63) Continuation of application No. 17/773,377, filed as application No. PCT/KR2021/010140 on Aug. 3, 2021.

(Continued)

(30) Foreign Application Priority Data

Oct. 22, 2020 (KR) .......... 10-2020-0137773
May 10, 2021 (KR) .......... 10-2021-0060156

(51) Int. Cl.
*H04W 74/08* (2009.01)
*H04W 72/23* (2023.01)
*H04W 74/00* (2009.01)

(52) U.S. Cl.
CPC ....... *H04W 74/0808* (2013.01); *H04W 72/23* (2023.01); *H04W 74/006* (2013.01)

(58) Field of Classification Search
None
See application file for complete search history.

(56) References Cited

U.S. PATENT DOCUMENTS

2020/0280971 A1* 9/2020 Moon .................. H04L 5/0053
2022/0061094 A1* 2/2022 Jung .................. H04W 72/542
(Continued)

FOREIGN PATENT DOCUMENTS

| JP | 2020072428 | 5/2020 |
| KR | 20200028893 | 3/2020 |
| WO | WO 2020/027533 | 2/2020 |

OTHER PUBLICATIONS

International Search Report in International Appln. No. PCT/KR2021/010140, dated Nov. 17, 2021, 5 pages (with English translation).

(Continued)

*Primary Examiner* — Clemence S Han
(74) *Attorney, Agent, or Firm* — Fish & Richardson P.C.

(57) ABSTRACT

According to an embodiment of the present disclosure, a user equipment (UE) may obtain fixed frame period (FFP)-related information, and perform clear channel assessment (CCA) for at least one FFP starting with a UE-initiated channel occupancy time (COT) for transmission of an uplink signal. The FFP-related information may include information about an FFP starting offset and information about an FFP duration or period, and the UE may identify a starting time of the FFP, based on the FFP starting offset having an orthogonal frequency division multiplexing (OFDM) symbol-level granularity.

13 Claims, 18 Drawing Sheets

Related U.S. Application Data

(60) Provisional application No. 63/192,074, filed on May 23, 2021, provisional application No. 63/175,038, filed on Apr. 14, 2021, provisional application No. 63/143,934, filed on Jan. 31, 2021, provisional application No. 63/138,348, filed on Jan. 15, 2021, provisional application No. 63/104,506, filed on Oct. 22, 2020, provisional application No. 63/062,408, filed on Aug. 6, 2020.

(56) References Cited

U.S. PATENT DOCUMENTS

| | | | |
|---|---|---|---|
| 2022/0110118 A1* | 4/2022 | Wu | H04W 72/0446 |
| 2022/0304059 A1* | 9/2022 | Lei | H04W 74/08 |
| 2022/0377790 A1* | 11/2022 | Awadin | H04W 74/006 |
| 2022/0408461 A1* | 12/2022 | Lei | H04W 72/23 |

OTHER PUBLICATIONS

Oppo, "DL signals and channels for NR-U," R1-1912504, Presented at 3GPP TSG RAN WG1 #99, Reno, USA, Nov. 18-22, 2019, 4 pages.

Qualcomm Incorporated, "Channel access procedures for NR unlicensed," R1-1912938, Presented at 3GPP TSG RAN WG1 Meeting #99, Reno, USA, Nov. 18-Nov. 22, 2019, 18 pages.

LG Electronics, "Discussion on unlicensed band URLLC/IIOT," 3GPP TSG RAN WG1 #104bis-e, R1-2103349, e-Meeting, Apr. 12-20, 2021, 17 pages.

Nokia, Nokia Shanghai Bell, "Remaining Issues on Channel Access Procedures for NR-U," 3GPP TSG RAN WG1 #102-e, R1- 2006370, e-Meeting, Aug. 17-28, 2020, 5 pages.

Samsung, "Enhancements for unlicensed band URLLC/IIoT," 3GPP TSG RAN WG1 #104-e, R1-2101203, e-Meeting, Jan. 25-Feb. 5, 2021, 9 pages.

* cited by examiner

Carrier aggregation between L-band and U-band

Standalone U-band(s)

METHOD AND APPARATUS FOR TRANSMITTING AND RECEIVING SIGNAL IN WIRELESS COMMUNICATION SYSTEM

CROSS-REFERENCE TO RELATED APPLICATIONS

This application is a continuation of U.S. application Ser. No. 17/773,377, filed on Apr. 29, 2022, which is a National Stage application under 35 U.S.C. § 371 of International Application No. PCT/KR2021/010140, filed on Aug. 3, 2021, which claims the benefit of U.S. Provisional Application No. 63/192,074, filed on May 23, 2021, Korean Application No. 10-2021-0060156, filed on May 10, 2021, U.S. Provisional Application No. 63/175,038, filed on Apr. 14, 2021, U.S. Provisional Application No. 63/143,934, filed on Jan. 31, 2021, U.S. Provisional Application No. 63/138,348, filed on Jan. 15, 2021, Korean Application No. 10-2020-0137773, filed on Oct. 22, 2020, U.S. Provisional Application No. 63/104,506, filed on Oct. 22, 2020, and U.S. Provisional Application No. 63/062,408, filed on Aug. 6, 2020. The disclosures of the prior applications are hereby incorporated by reference herein in their entirety.

TECHNICAL FIELD

The present disclosure relates to a wireless communication system, and more particularly, to a method and apparatus for transmitting/receiving an uplink/downlink wireless signal in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to an aspect of the present disclosure, a method of performing a channel access procedure on a shared spectrum by a user equipment (UE) in a wireless communication system may include obtaining fixed frame period (FFP)-related information for frame based equipment (FBE), performing clear channel assessment (CCA) for at least one FFP starting with a UE-initiated channel occupancy time (COT), based on the FFP-related information, and transmitting an uplink signal in an FFP determined based on the CCA. The FFP-related information may include information about an FFP starting offset and information about an FFP duration or period, and the UE may identify a starting time of the FFP, based on the FFP starting offset having an orthogonal frequency division multiplexing (OFDM) symbol-level granularity.

A maximum value of the FFP starting offset having the OFDM symbol-level granularity may be determined based on a length of the FFP duration or period.

A first time length indicated by the information about the FFP starting offset may always be set to be less than a second time length indicated by the information about the FFP duration or period.

The FFP-related information may be obtained through higher-layer signaling.

When a result of the CCA is busy and the UE is not capable of starting a COT of the UE in the FFP, the UE may transmit the uplink signal based on sharing a base station (BS)-initiated COT.

The at least one FFP starting with the UE-initiated COT may be a first-type FFP, and an FFP starting with a BS-initiated COT may be a second-type FFP different from the first-type FFP. The start of the first-type FFP may not be time-aligned with the start of the second-type FFP. The start of an idle period included in the first-type FFP may be time-aligned with the start of an idle period included in the second-type FFP.

According to an aspect of the present disclosure, a computer-readable recording medium recording a program for performing the above-described signal reception method may be provided.

According to an aspect of the present disclosure, a UE for performing the above-described signal reception method may be provided.

According to an aspect of the present disclosure, an apparatus for controlling a UE for performing the above-described signal reception method may be provided.

According to an aspect of the present disclosure, a method of receiving a signal on a shared spectrum by a BS in a wireless communication system may include transmitting FFP-related information for FBE, and monitoring an uplink signal in each FFP starting with a UE-initiated channel occupancy time (COT), based on the FFP-related information. The FFP-related information may include information about an FFP starting offset and information about an FFP duration or period, and the BS may always set a first time length corresponding to the FFP starting offset to be less than a second time length corresponding to the FFP duration or period, and indicate the determined first time length based on an orthogonal frequency division multiplexing (OFDM) symbol-level granularity by the information about the FFP starting offset.

According to an aspect of the present disclosure, a BS for performing the above-described signal transmission method may be provided.

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
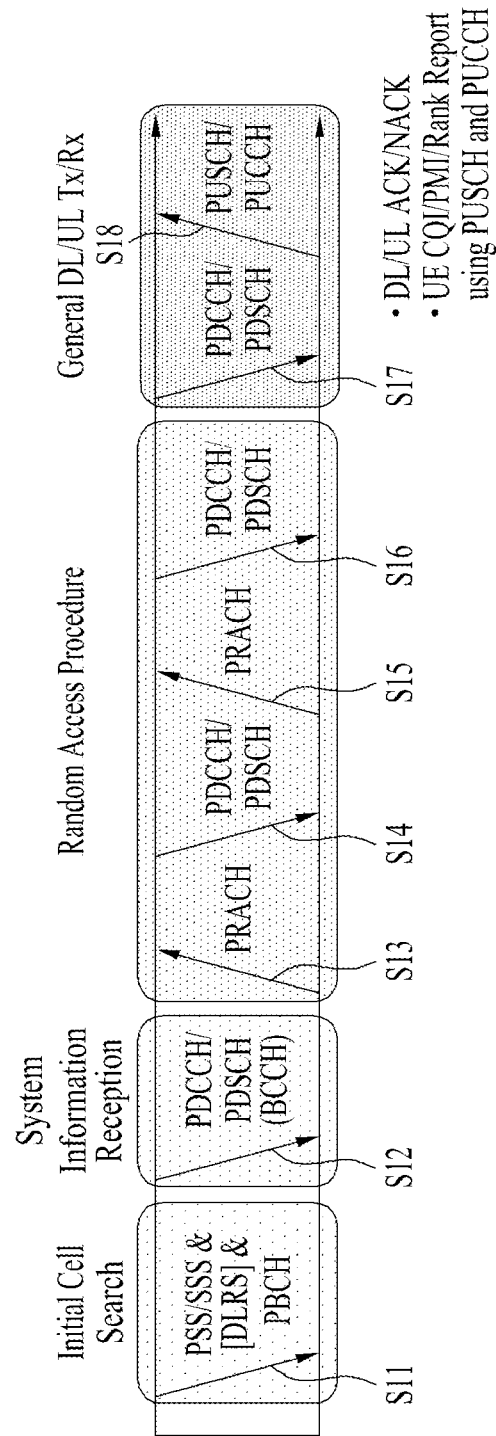
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, and so on are distinguished from each other and indexed, for convenience of description, which does not mean that each of them necessarily constitutes an independent invention or that each of them should be implemented only individually. Unless explicitly contradicting each other, it may be derived/understood that at least some of the sections, embodiments, examples, options, methods, schemes, and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
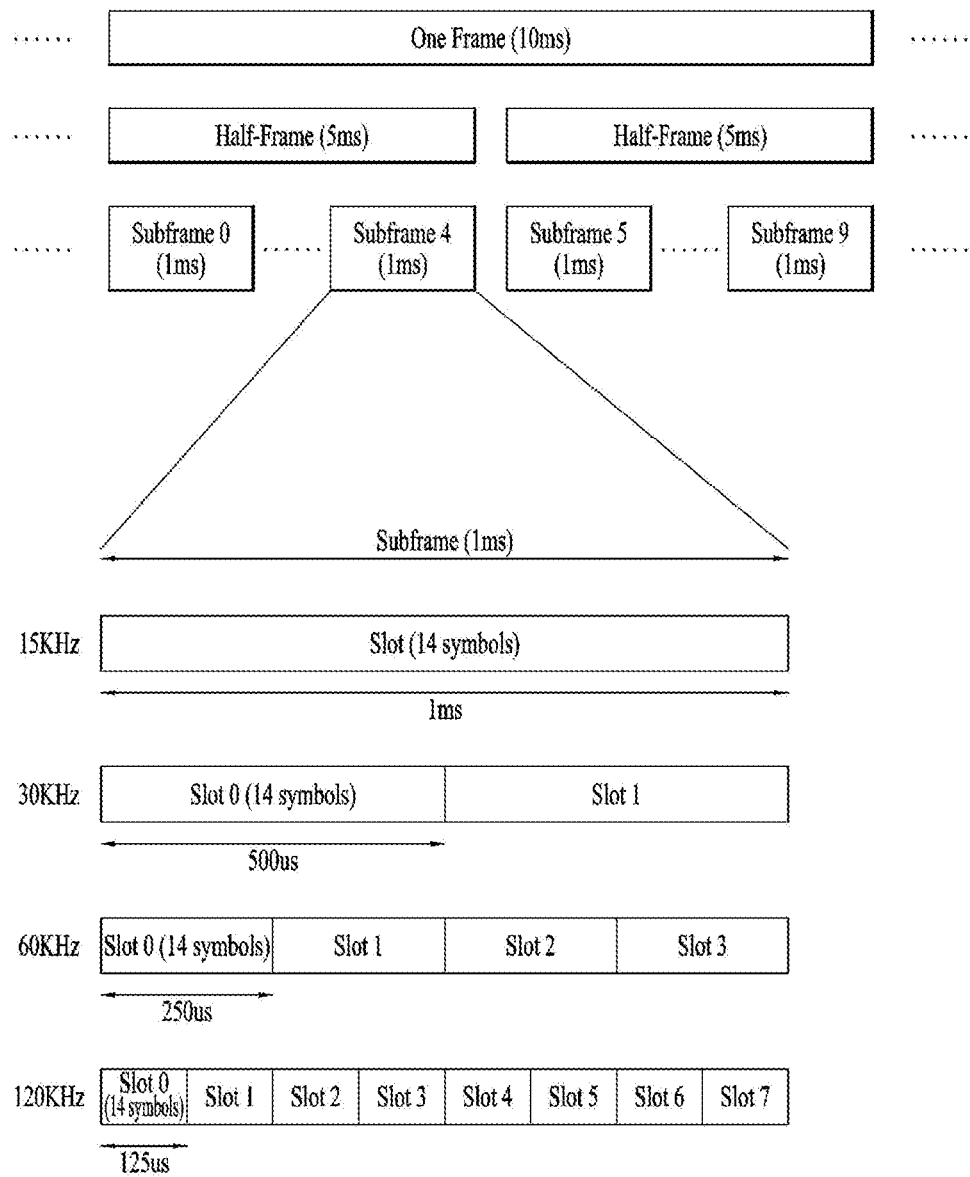
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame,u}_{slot}$: Number of slots in a frame
*$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
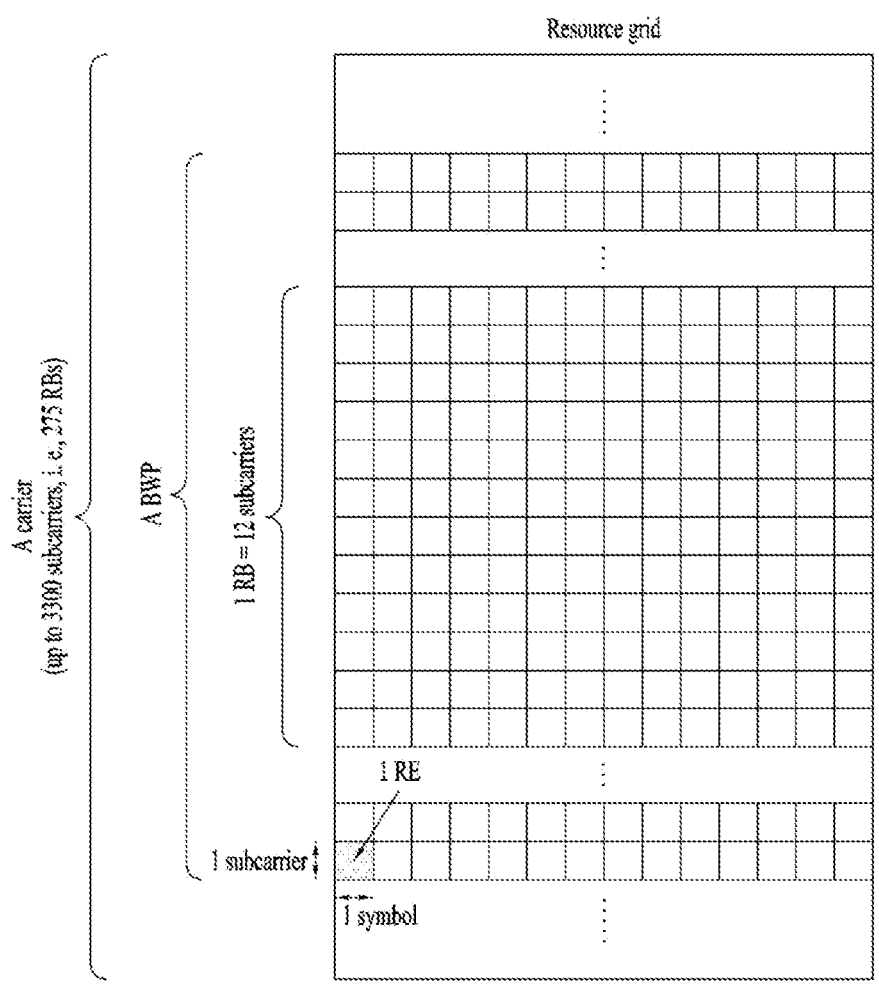
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
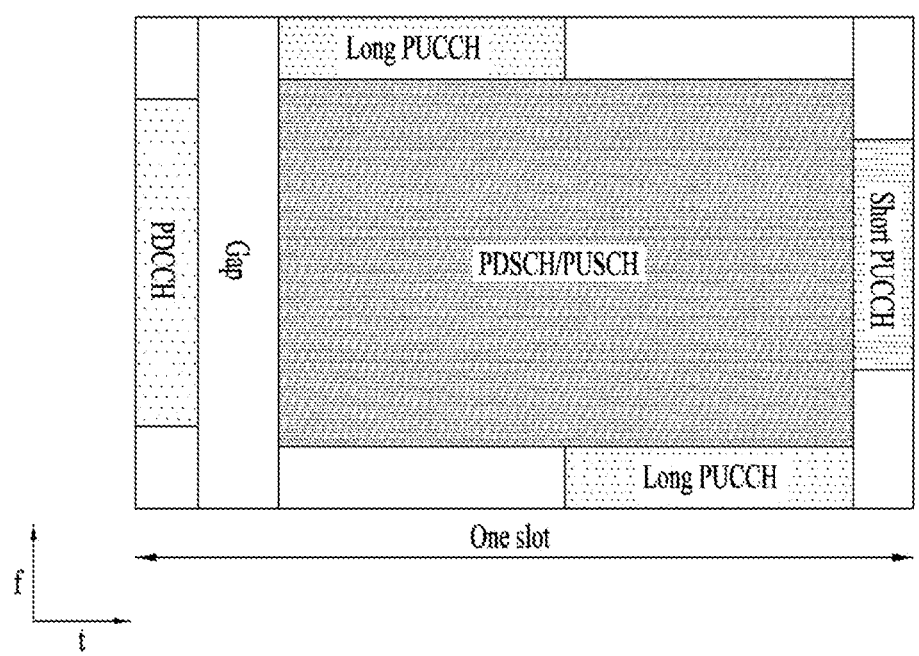
FIG. 4 illustrates exemplary mapping of physical channels in a slot.

FIG. 4 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE.

Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured by higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.
 monitoringSlotPeriodicityAndOffset: A PDCCH monitoring periodicity (in slots) and a PDCCH monitoring offset (in slots).
 monitoringSymbolsWithinSlot: PDCCH monitoring symbols in a slot (e.g., the first symbol(s) of a CORESET).
 nrofCandidates: The number of PDCCH candidates (one of 0, 1, 2, 3, 4, 5, 6, and 8) for each AL={1, 2, 4, 8, 16}.
* An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

SR(Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 5:
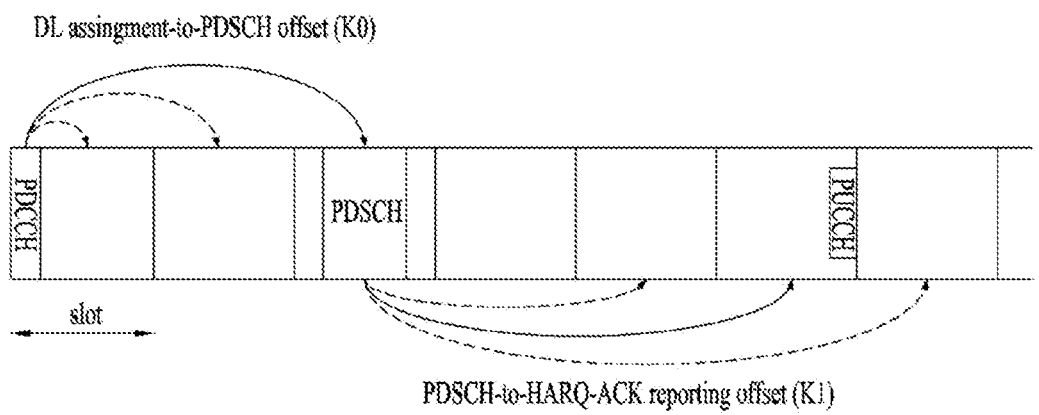
FIG. 5 illustrates an exemplary acknowledgment/negative acknowledgment (ACK/NACK) transmission process.

FIG. 5 illustrates an exemplary ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bit-wise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 6:
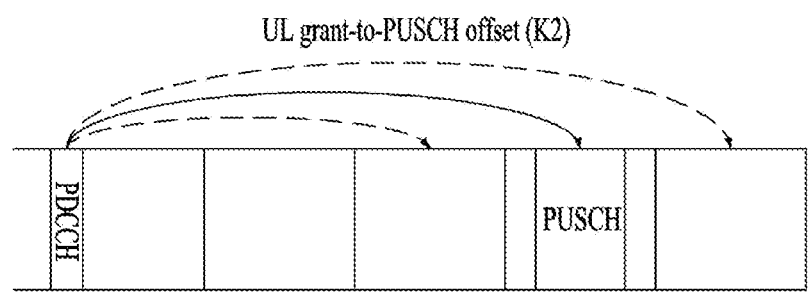
FIG. 6 illustrates an exemplary physical uplink shared channel (PUSCH) transmission process.

FIG. 6 illustrates an exemplary PUSCH transmission procedure. Referring to FIG. 6, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Figure 7:
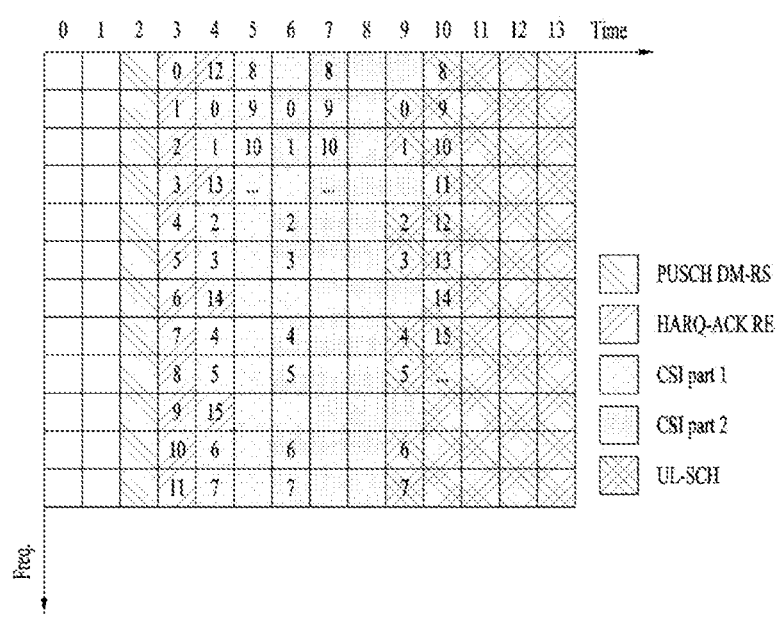
FIG. 7 illustrates an example of multiplexing control information in a PUSCH.

FIG. 7 illustrates exemplary multiplexing of UCI in a PUSCH. When a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 7, an HARQ-ACK and CSI are carried in a PUSCH resource.

Figure 8A:
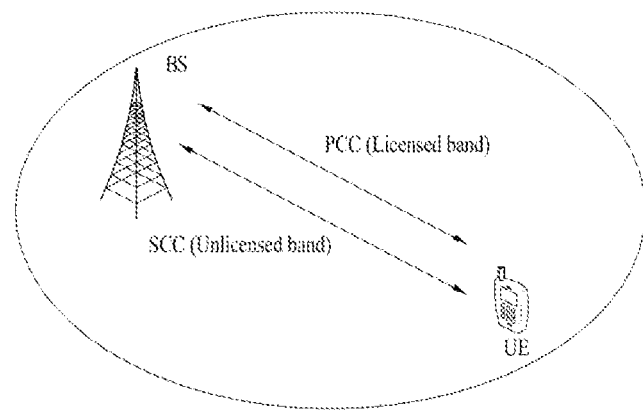
FIGS. 8A and 8B illustrate an exemplary wireless communication system supporting an unlicensed band.
Figure 8B:
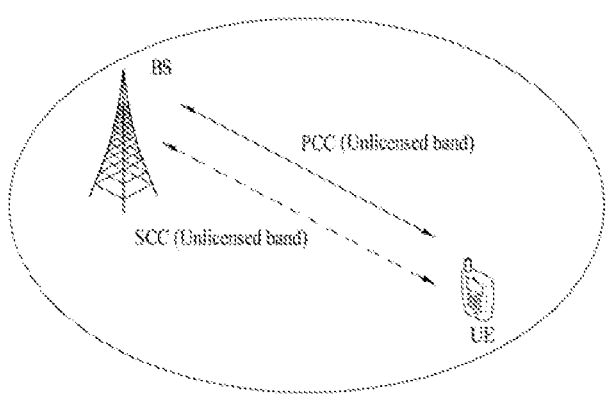

FIGS. 8A and 8B illustrate a wireless communication system supporting an unlicensed band. For convenience, a cell operating in a licensed band (hereinafter, L-band) is defined as an LCell and a carrier of the LCell is defined as a (DL/UL) LCC. A cell operating in an unlicensed band (hereinafter, U-band) is defined as a UCell and a carrier of the UCell is defined as a (DL/UL) UCC. A carrier of a cell may represent an operating frequency (e.g., a center frequency) of the cell. A cell/carrier (e.g., CC) may generically be referred to as a cell.

When carrier aggregation is supported, one UE may transmit and receive signals to and from a BS in a plurality of aggregated cells/carriers. If a plurality of CCs is configured for one UE, one CC may be configured as a primary CC (PCC) and the other CCs may be configured as secondary CCs (SCCs). Specific control information/channels (e.g., a CSS PDCCH and PUCCH) may be configured to transmit and receive signals only in the PCC. Data may be transmitted and received in the PCC and/or the SCCs. In FIG. 8A, the UE and the BS transmit and receive signals in the LCC and the UCC (non-standalone (NSA) mode). In this case, the LCC may be configured as the PCC and the UCC may be configured as the SCC. If a plurality of LCCs is configured for the UE, one specific LCC may be configured as the PCC and the other LCCs may be configured as the SCCs. FIG. 8A corresponds to LAA of the 3GPP LTE system. FIG. 8B illustrates the case in which the UE and the BS transmit and receive signals in one or more UCCs without the LCC (SA mode). In this case, one of the UCCs may be configured as the PCC and the other UCCs may be configured as the SCCs. To this end, PUCCH, PUSCH, PRACH transmission can be supported. Both the NSA mode and the SA mode may be supported in an unlicensed band of the 3GPP NR system.

Unless otherwise mentioned, the definitions below are applicable to terms as used in the present disclosure.

Channel: A carrier or a part of a carrier including consecutive RBs in which a channel access procedure (CAP) is performed in a shared spectrum.

Channel access procedure (CAP): A procedure of evaluating the availability of a channel based on sensing to determine whether the channel is used by other communication node(s), before a signal transmission. A basic unit for sensing is a sensing slot with a duration Tsl of 9 us. The sensing slot duration Tsl may be considered to be idle when a BS or a UE senses the channel during the sensing slot duration, and power detected for at least 4 us within the sensing slot duration is less than an energy detection threshold XThresh. Otherwise, the sensing slot duration Tsl of 9 us may be considered to be busy. A CAP may be referred to as listen-before-talk (LBT).

Channel occupancy: Transmission(s) on channel(s) from a BS/UE after a CAP.

Channel occupancy time (COT): A total time for which the BS/UE and any BS/UE(s) sharing the channel occupancy perform transmission(s) on the channel after the BS/UE corresponding CAPs. When a COT is determined, if a transmission gap is less than or equal to 25 us, the gap duration may also be counted in the COT. The COT may be shared for transmission between the BS and corresponding UE(s).

DL transmission burst: A set of transmissions from the BS without any gaps greater than 16 us. Transmissions from the BS separated by a gap of more than 16 us are considered as separate DL transmission bursts. The BS may perform transmission(s) after a gap within a DL transmission burst without sensing channel availability.

UL transmission burst: A set of transmissions from the UE without any gaps greater than 16 us. Transmissions from the UE separated by a gap of more than 16 us are considered as separate UL transmission bursts. The UE may perform transmission(s) after a gap within a UL transmission burst without sensing channel availability.

Discovery burst: A DL transmission burst including a set of signal(s) and/or channel(s) confined within a window and associated with a duty cycle. In the LTE-based system, a discovery burst may be transmission(s) initiated by a BS, including a primary synchronization signal (PSS), a secondary synchronization signal (SSS) and a cell-specific reference signal (CRS) and further including a non-zero power CSI-RS. In the NR-based system, a discovery burst may be transmission(s) initiated by a BS, including at least an SS/PBCH block and further including a CORESET for a PDCCH scheduling a PDSCH with SIB1, a PDSCH carrying SIB1, and/or non-zero power CS-RS.

Figure 9:
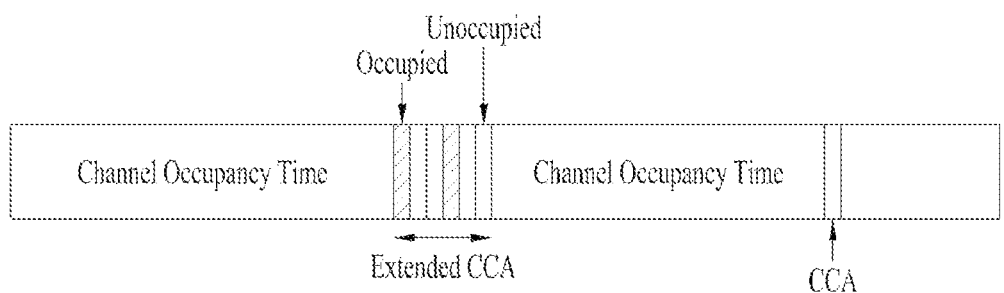
FIG. 9 illustrates an exemplary method of occupying resources in an unlicensed band.

FIG. 9 illustrates a method of occupying resources in an unlicensed band. According to regional regulations concerning the unlicensed band, a communication node in the unlicensed band needs to determine, before signal transmission, whether other communication nodes use a channel. Specifically, the communication node may first perform carrier sensing (CS) before signal transmission to check whether other communication nodes transmit signals. If it is determined that other communication nodes do not transmit signals, this means that clear channel assessment (CCA) is confirmed. When there is a predefined CCA threshold or a CCA threshold configured by higher layer (e.g., RRC) signaling, if energy higher than the CCA threshold is detected in a channel, the communication node may determine that the channel is in a busy state and, otherwise, the communication node may determine that the channel is in an idle state. For reference, in Wi-Fi standard (802.11ac), the CCA threshold is set to −62 dBm for a non-Wi-Fi signal and to −82 dBm for a Wi-Fi signal. Upon determining that the channel is in an idle state, the communication node may start to transmit signals in the UCell. The above processes may be referred to as listen-before-talk (LBT) or a channel access procedure (CAP). LBT and CAP may be used interchangeably.

In Europe, two LBT operations are defined: frame based equipment (FBE) and load based equipment (LBE).

Figure 10:
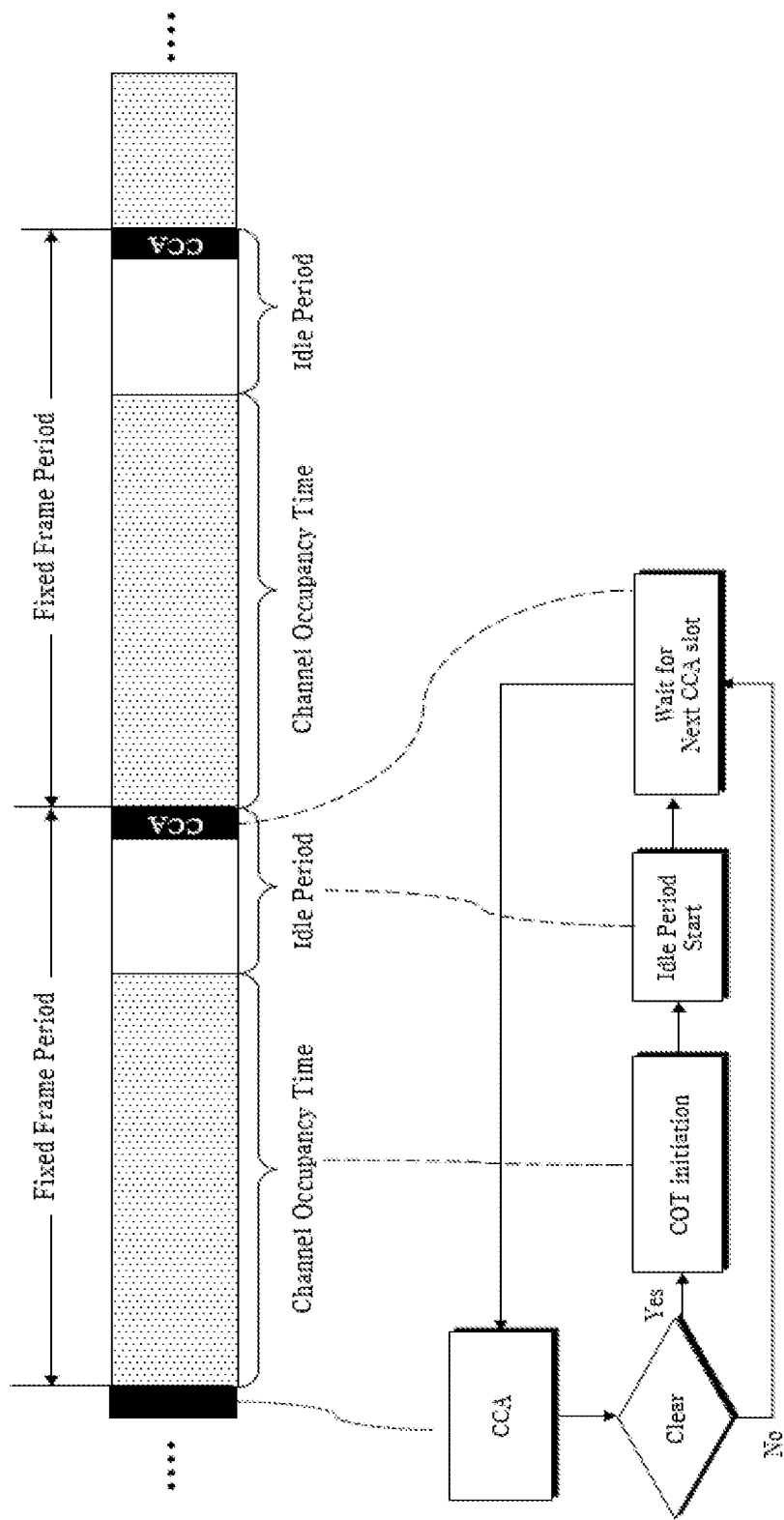
FIG. 10 illustrates exemplary frame based equipment (FBE)-based channel access.

Referring to FIG. 10, in FBE-based LBT, one fixed frame is made up of a channel occupancy time (e.g., 1 to 10 ms), which is a time period during which once a communication node succeeds in channel access, the communication node may continue transmissions, and an idle period corresponding to at least 5% of the channel occupancy time, and CCA is defined as an operation of monitoring a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

Figure 11:
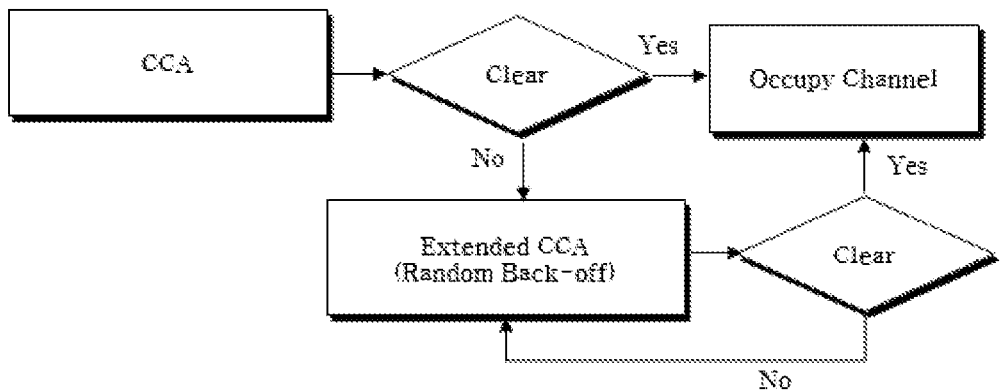
FIG. 11 illustrates exemplary load based equipment (LBE)-based channel access.

Referring to FIG. 11, in LBE-based LBT, the communication node may set $q \in \{4, 5, \ldots, 32\}$ and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

Table 6 illustrates exemplary CAPs supported in NR-U.

TABLE 6

| | Type | Explanation |
|---|---|---|
| DL | Type 1 CAP | CAP with random back-off time duration spanned by the sensing slots that are sensed to be idle before a downlink transmission(s) is random |
| | Type 2 CAP | CAP without random back-off |
| | Type 2A, 2B, 2C | time duration spanned by sensing slots that are sensed to be idle before a downlink transmission(s) is deterministic |
| UL | Type 1 CAP | CAP with random back-off time duration spanned by the sensing slots that are sensed to be idle before a downlink transmission(s) is random |
| | Type 2 CAP | CAP without random back-off |
| | Type 2A, 2B, 2C | time duration spanned by sensing slots that are sensed to be idle before a downlink transmission(s) is deterministic |

In the 3GPP standardization, Type 1 CAP may be referred to as Category 4 (CAT4)-LBT, Type 2A CAP and Type 2B CAP may be referred to as CAT2-LBT, and Type 2C CAP may be referred to as CAT1-LBT. CAT2-LBT (i.e., Type 2A CAP and Type 2B CAP) are FBE-based LBT, and CAT4-LBT is LBE-based LBT.

Referring to Table 6, the BS may perform one of the following CAPs to transmit a DL signal in an unlicensed band.

(1) Type 1 DL CAP

In a Type 1 DL CAP, a time duration spanned by sensing slots that are sensed to be idle before DL transmission(s) is random. The Type 1 DL CAP is applicable to the following transmissions.

Transmission(s) initiated by a BS including (i) a unicast PDSCH with user plane data or (ii) a unicast PDSCH with user plane data and a unicast PDCCH scheduling user plane data, or Transmission(s) initiated by a BS with (i) only a discovery burst or with (ii) a discovery burst multiplexed with non-unicast information.

Figure 12:
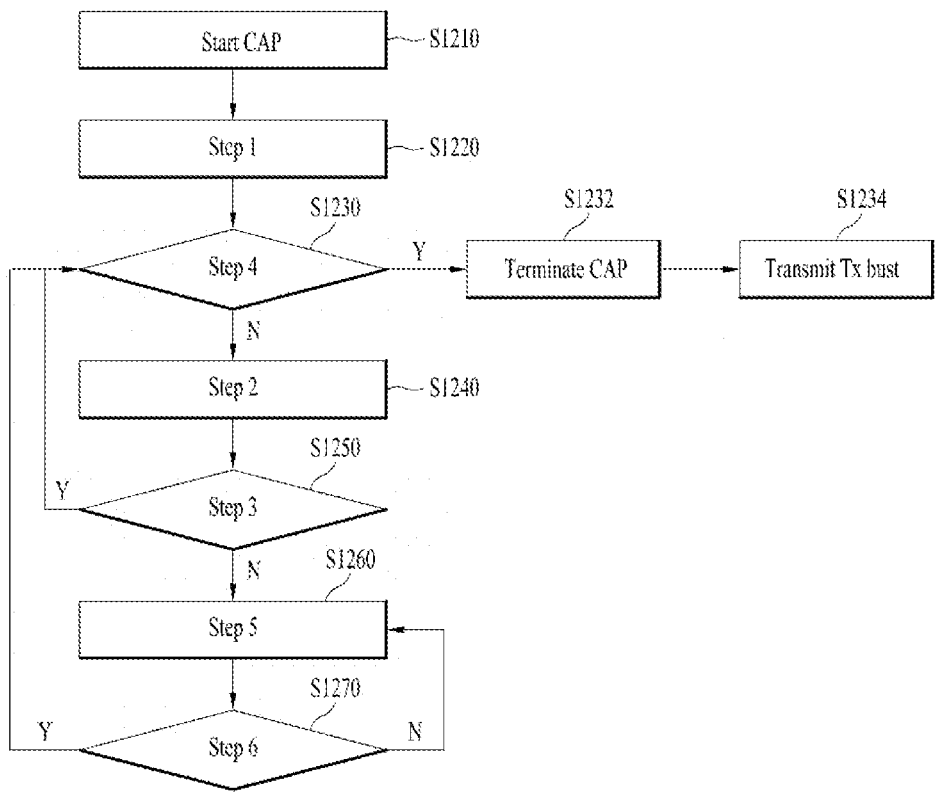
FIG. 12 is a flowchart illustrating a Type 1 channel access procedure (CAP) (e.g., an example of LBE-based channel access) of a base station (BS), for a downlink (DL) signal transmission.

Type 1 DL CAP in Table 6 will be described in greater detail with reference to FIG. 12. The BS may sense whether a channel is idle during sensing slot durations of a defer duration Td and then when a counter N is zero, the BS may perform a transmission (S1234). The counter N is adjusted by sensing the channel during additional sensing slot duration(s) according to the following procedure:

Step 1) (S1220) set N=Ninit where Ninit is a random number uniformly distributed between 0 and CWp, and go to step 4.

Step 2) (S1240) if N>0 and the BS chooses to decrement the counter, set N=N−1.

Step 3) (S1250) sense the channel for an additional sensing slot duration, and if the additional sensing slot duration is idle (Y), go to step 4; else, go to step 5.

Step 4) (S1230) if N=0 (Y), stop (S1232); else (N), go to step 2.

Step 5) (S1260) sense the channel until either a busy sensing slot is detected within an additional defer duration Td or all the sensing slots of the additional defer duration Td are detected to be idle.

Step 6) (S1270) if the channel is sensed to be idle during all the sensing slot durations of the additional defer duration Td (Y), go to step 4; else, go to step 5.

(2) Type 2 DL CAP

In a Type 2A/2B DL CAP, when sensing a channel to be idle during at least a sensing duration of 25 us, the BS may perform a DL transmission in an unlicensed band immediately after the sensing is completed. In a Type 2C DL CAP, the BS may immediately access a channel without sensing.

As described before with reference to Table 6, a plurality of CAP types (i.e., LBT types) may be defined for UL transmissions in an unlicensed band. For example, Type 1 CAP or Type 2 CAP may be defined for UL transmissions. The UE may perform a CAP (e.g., Type 1 or Type 2) configured/indicated by the BS, for a UL signal transmission.

(1) Type 1 UL CAP

Figure 13:
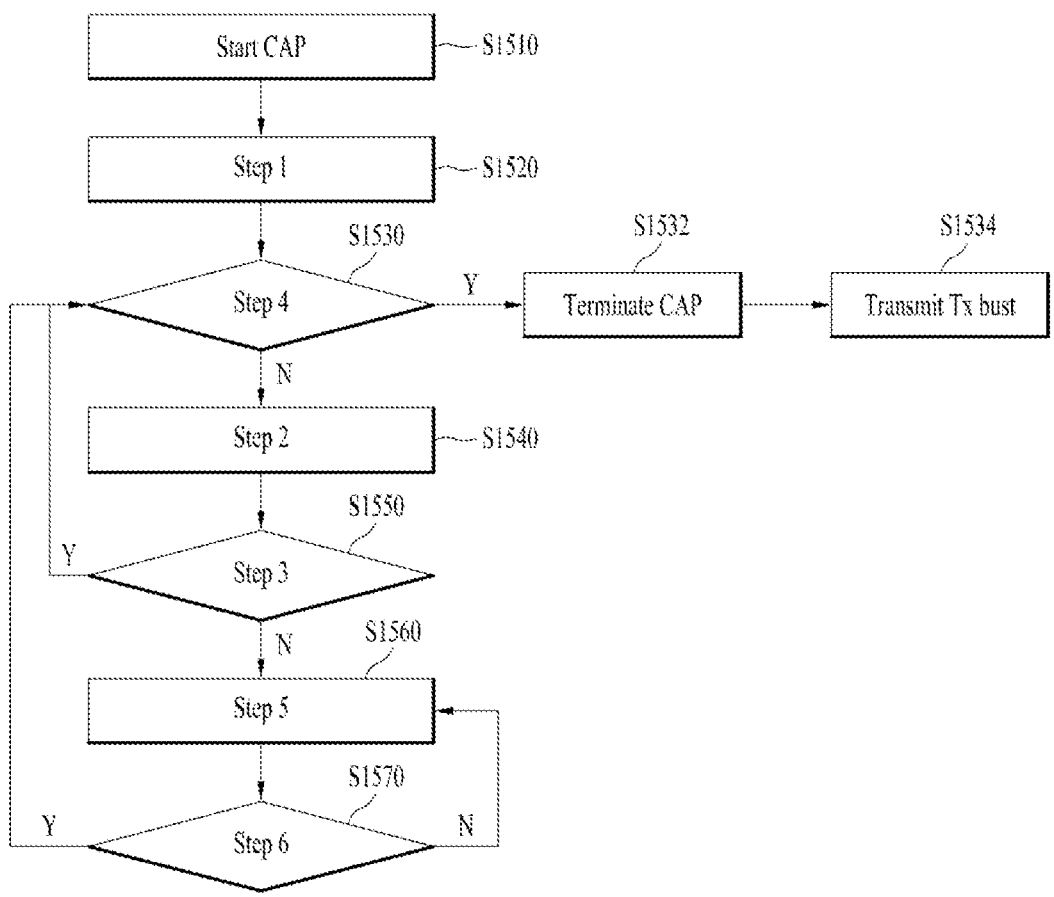
FIG. 13 is a flowchart illustrating a Type 1 CAP (e.g., an example of LBE-based channel access) of a user equipment (UE), for an uplink (UL) signal transmission.

The Type 1 UL CAP of Table 6 will be described in greater detail with reference to FIG. 13. A UE may start the CAP for a signal transmission in an unlicensed band (S1510). The UE may randomly select a backoff counter N within a contention window (CW) according to step 1. N is set to an initial value $N_{init}$ (S1520). Any value between 0 and $CW_p$ is selected as $N_{init}$. Subsequently, when the backoff counter N is 0 according to step 4 (S1530; Y), the UE ends the CAP (S1532). Then, the UE may transmit a Tx burst (S1524). On the contrary, when the backoff counter is not 0 (S1530; N), the UE decreases the backoff counter by 1 according to step 2 (S1540). Subsequently, the UE checks whether a channel of UCell(s) is idle (S1550). When the channel is idle (S1550; Y), the UE checks whether the backoff counter is 0 (S1530). On the contrary, when the channel is not idle, that is, the channel is busy in step S1550 (S1550; N), the UE checks whether the channel is idle during a defer duration $T_d$ (25 usec or longer) greater than a slot duration (e.g., 9 uc) (S1560). When the channel is idle during the defer duration (S1570; Y), the UE may resume the CAP. The defer duration may include a 16-usec duration and the immediately following $m_p$ consecutive slot durations (e.g., 9 us). On the contrary, when the channel is busy during the defer duration (S1570; N), the UE re-performs step S1560 to check again whether the channel is idle during a new defer duration.

Table 7 illustrates that $m_p$, a minimum CW $CW_{min,p}$, a maximum CW $CW_{max,p}$, a maximum channel occupancy time (MCOT) $T_{ulmcot,p}$, and an allowed CW size for a CAP vary according to a channel access priority class.

TABLE 7

| Channel Access Priority Class (p) | $m_p$ | $CW_{min,p}$ | $CW_{max,p}$ | $T_{ulmcot,p}$ | allowed CWp sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |

TABLE 7-continued

| Channel Access Priority Class (p) | $m_p$ | $CW_{min,p}$ | $CW_{max,p}$ | $T_{ulmcot,p}$ | allowed CWp sizes |
|---|---|---|---|---|---|
| 4 | 7 | 15 | 1023 | 6 ms or 10 ms | {15, 31, 63, 127, 255, 511, 1023} |

A CW size (CWS) applied to the Type 1 CAP may be determined in various ways. For example, the CWS may be adjusted based on whether a new data indicator (NDI) value for at least one HARQ process related to the HARQ process ID, HARQ_ID_ref of a UL-SCH within a predetermined time period (e.g., a reference TU) is toggled. In the case where the UE performs a signal transmission on a carrier by using a Type 1 CAP related to a channel access priority class p, when an NDI value for at least one HARQ process related to HARQ_ID_ref is toggled, the UE sets $CW_p=CW_{min,p}$ for all priority classes p∈{1, 2, 3, 4} Otherwise, the UE increments CWp for all priority classes p∈{1, 2, 3, 4} to the next higher allowed value.

A reference frame $n_{ref}$ (or reference slot $n_{ref}$) is determined as follows.

When the UE receives a UL grant in subframe (or slot) $n_g$, and performs a transmission including a UL-SCH without gaps, starting from subframe (or slot) $n_0$ in a subframe (or slot) $n_0, n_1, \ldots, n_w$, the reference subframe (or slot) $n_{ref}$ is subframe (or slot) $n_0$.

(2) Type 2 UL CAP

When sensing a channel to be idle at least during a sensing duration $T_{short\_ul}$ of 25 us, the UE may perform a UL transmission (e.g., PUSCH) in an unlicensed band immediately after the sensing is completed. $T_{short\_ul}$ may be $T_{sl}(=9$ us$)+T_f(=16$ us$)$.

Figure 14:
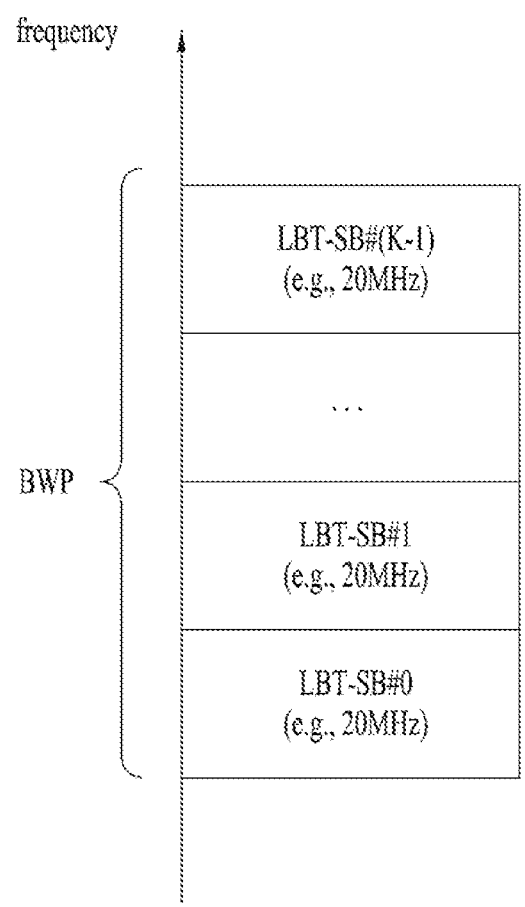
FIG. 14 illustrates an exemplary plurality of LBT subbands (LBT-SBs) included in a frequency band (e.g., bandwidth part (BWP)) in a shared spectrum.

FIG. 14 illustrates an exemplary case in which a plurality of LBT-subbands (LBT-SBs) are included in an unlicensed band. Referring to FIG. 14, a plurality of LBT-SBs may be included in a BWP of a cell (or carrier). An LBT-SB may have, for example, a band of 20 MHz. An LBT-SB may include a plurality of consecutive (P)RBs in the frequency domain, and may be referred to as a (P)RB set. While not shown, a guard band (GB) may be included between LBT-SBs. Accordingly, a BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SBs/RBs may be configured/defined to be indexed increasingly from a lower frequency band to a higher frequency band.

UE-Initiated COT Structure for FBE and Unlicensed Band Operation Based on the Same The present disclosure proposes a new UE-initiated COT for FBE. Those skilled in the art will understand that the proposed UE-initiated COT for FBE is clearly distinguishable from a BS-initiated COT or a BS/UE-initiated COT for LBE.

Before a description of the proposed new UE-initiated COT for FBE, an FBE-based LBT/CAP introduced to the NR Rel-16 system will be described. In NR Rel-16, a fixed frame period (FFP) transmission structure starting with a BS-initiated COT has been introduced (e.g., Type 2A/2B CAP), and its key contents are summarized as follows.

1) Information about an FFP duration/period and an FFP starting time may be configured for the UE.

A. An FFP may be configured to span one of {1, 2, 2.5, 4, 5, 10} ms including an idle period.

B. The starting time of the FFP is set to be aligned with every even radio frame number.

C. The UE may determine/configure the FFP (e.g., FFP position/length/start/end) based on corresponding information (e.g., the FFP period/FFP starting time).

2) In NR Rel-16, FFP-related COT generation/initiation is possible only by the BS, and this structure in which every FFP starts with a BS-initiated COT is adopted.

A. Only when the UE succeeds in detecting a specific DL signal (e.g., an SSB, SIB, UE (group)-common PDCCH (GC-PDCCH), and/or UE-specific PDCCH) from the BS in FFP #i, the UE may transmit a configured UL resource (e.g., PRACH or PUSCH) in the same FFP, FFP #i.

B. A transmission of the BS that has directly generated a COT/FFP may be defined as a (BS) initiated-COT transmission, and a transmission of the UE based on the detection of the DL signal from the BS within the COT/FFP generated by the BS may be defined as a shared-COT-based transmission.

3) The BS may generate a BS-initiated COT by performing LBT during a predetermined time (e.g., 25 usec) shortly before an FFP.

A. The UE and the BS may perform a UL/DL transmission in the FFP period by performing 16-usec LBT or 25-usec LBT according to the size of a DL-to-UL gap or a UL-to-DL gap in the FFP period.

In Rel-17, the introduction of an FFP transmission structure starting with a UE-initiated COT may be considered to efficiently support a URLLC service in an FBE-based U-band environment. For this purpose, the following operation methods are proposed.

Proposals of a UE-initiated COT for FBE will be described below. In the following description, a DL signal may mean a specific DL signal according to the context.

[Proposal 1]

1) In addition to information about the period and starting time of a BS FFP that may start with a BS-initiated COT (hereinbelow, referred to as "FFP-g"), information about a UE FFP that may start with a UE-initiated COT (hereinbelow, referred to as "FFP-u") may be configured for the UE. The information about the FFP-u may include information about an FFP-u period and/or an FFP-u starting time.

2) The UE may be defined/configured to perform LBT shortly before the starting time of its FFP-u (e.g., during 25 usec, 9 usec, or 16 usec).

A. When determining that a channel is idle as a result of the LBT, the UE may start a corresponding FFP-u transmission in a UE-initiated COT.

i. For example, the BS may be defined/configured to be enabled to perform a DL transmission in the FFP-u period under a specific condition (e.g., by sharing the UE-initiated COT). As an example of the specific condition for the DL transmission of the BS, a BS operation may be defined, in which only when the BS succeeds in detecting a specific UL signal (e.g., PUSCH/PUCCH DMRS, PRACH, or SRS) from the UE, the BS is enabled to perform the DL transmission (in the form of a shared-COT-based transmission) in the same FFP-u period.

B. When determining that the channel is busy as a result of the LBT, the UE may perform the afore-described Rel-16 operation as an exemplary UE operation, assuming an FFB-g transmission structure starting with a BS-initiated COT (for an FFP-g period including the FFP-u starting time).

i. In a specific example, the UE may be defined/configured to be enabled to perform a configured UL (e.g., PRACH or PUSCH) transmission in the FFP-g period, only when the UE succeeds in detecting a specific DL signal from the BS in the same FFP-g period. For example, the UE may be defined/configured not to be allowed to perform the UL transmission, when the UE fails to detect the DL signal in the FFP-g period.

3) Alternatively, a UE operation may be defined/configured to detect a DL signal for an FFP-g period located before the starting time of its FFP-u (in the FFP-g period including the starting time of its FFP-u).

A. When failing to detect the DL signal in the FFP-g period located before the starting time of its FFP-u, the UE may perform LBT (e.g., during 25 usec, 9 usec, or 16 usec) shortly before the starting time of its FFP-u.

i. When determining that the channel is idle as a result of the LBT, the UE may start the FFP-u transmission in the UE-initiated COT.

ii. On the contrary, when determining that the channel is busy as a result of the LBT, a UE operation may be defined, in which the UE performs no transmission (and/or no reception) in the FFP period, or the UE may perform the afore-described Rel-16 operation, assuming the FFP-g transmission structure starting with the BS-initiated COT.

B. When succeeding in detecting the DL signal in the FFP-g period located before the starting time of its FFP-u, the UE may perform the Rel-16 operation, assuming the FFP-g transmission structure starting with the BS-initiated COT.

C. For example, before starting the FFP-u transmission/UE-initiated COT configuration, the UE may attempt to detect the DL signal based on a preceding FFP-g (including the starting time of the FFP-u) in the time domain and preferentially consider a shared-COT-based transmission based on the DL signal detection. For example, when the UE is capable of sharing a preceding BS-initiated COT and transmitting its UL signal in the BS-initiated COT, the UE may skip the UE-initiated COT configuration (and LBT for this).

4) In the case where the UE is configured with a plurality of LBT-SBs (e.g., an RB set (+guard RBs)) and/or a plurality of carriers, the following operations may be considered.

Figure 15:
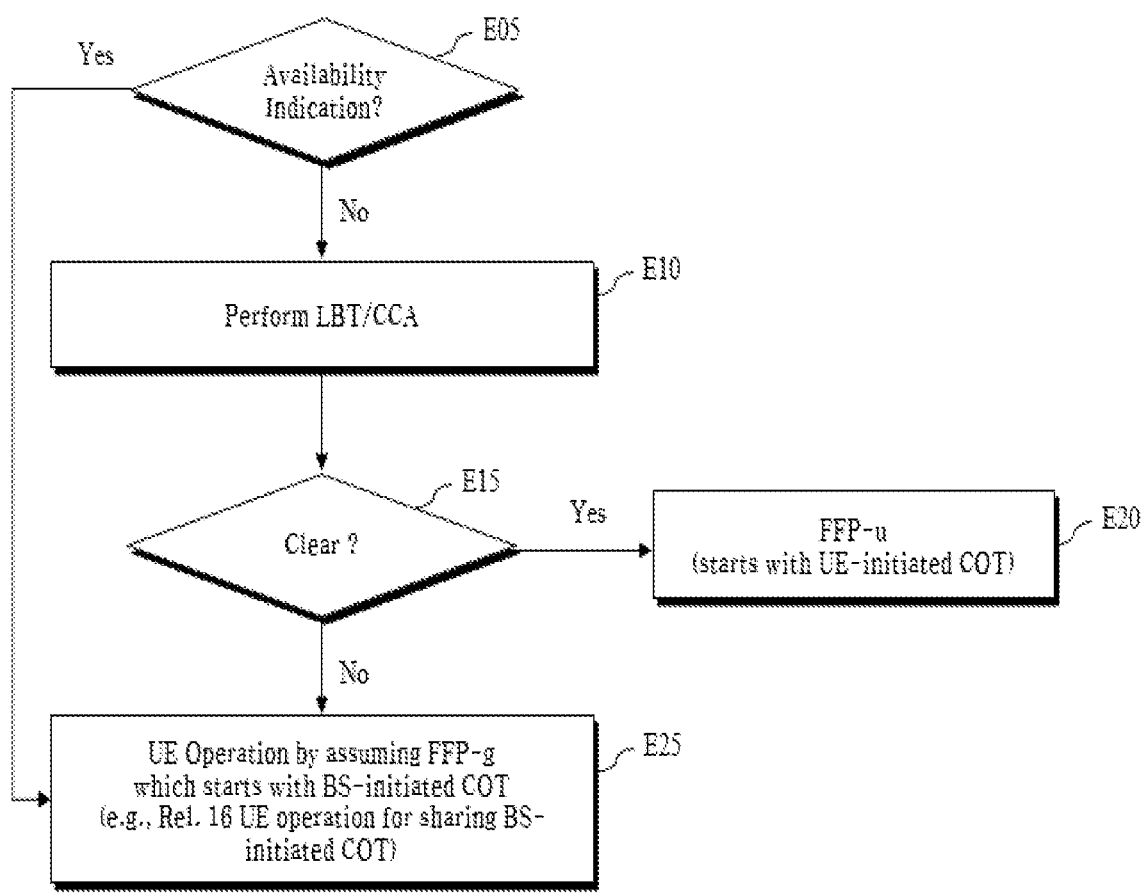
FIG. 15 is a diagram illustrating a channel access method according to an embodiment of the present disclosure.

A. When (for a specific FFP period/starting time), the UE determines that the channel is busy (and the UE detects a DL signal from the BS) in at least one LBT-SB or at least one carrier (i) as a result of LBT for an LBT-SB group including a plurality of LBT-SBs in one carrier (and/or a plurality of intra-band carriers), (ii) as a result of LBT for a carrier group including a plurality of intra-band carriers, or (iii) as a result of LBT for an LBT-SB group/carrier group indicated as available by the same bit of a corresponding PDCCH, when availability for an LBT-SB/carrier is indicated by specific signaling (e.g., a GC-PDCCH), the UE may perform the afore-described Rel-16 operation, assuming the FFP-g transmission structure starting with the BS-initiated COT for all LBT-SBs/carriers in an LBT-SB group/carrier group to which the corresponding LBT-SB/carrier belongs (for the FFP period/starting time). Alternatively, when at least one LBT-SB/carrier is indicated as available (based on BS-initiated COT generation/configuration) by specific signaling (e.g., a GC-PDCCH) (regardless of an LBT result), the UE may perform the afore-described Rel-16 operation, assuming the FFP-g transmission structure starting with the BS-initiated COT for all LBT-SBs/carriers in an LBT-SB group/carrier group to which the corresponding LBT-SB/carrier belongs (for the FFP period/starting time).
i. Accordingly, a UL resource (e.g. a (CG) PUSCH, a PRACH, or a PUCCH) configured at an FFP-u starting time (included in an FFP-g period (starting with a BS-initiated COT) based on the detected DL signal or an indication of the GC-PDCCH) in the LBT-SBs/carriers of the LBT-SB group/carrier group (including the LBT-SB/carrier in which the channel is busy as a result of the LBT, in which the DL signal of the BS is detected, or which is indicated as available by the GC-PDCCH) may be cancelled or processed as invalid; and/or the UE may be enabled/allowed to perform a shared-COT-based transmission based on the BS-initiated COT in a UL resource (e.g., a PUSCH or a PUCCH) configured or scheduled at the FFP-u starting time; and/or the UE may be enabled/allowed to perform only a one-time transmission without UE-initiated COT generation/configuration (e.g., the BS is not enabled to perform a DL transmission in the form of a shared-COT-based transmission based on the corresponding transmission).
ii. Therefore, the UE may not be allowed to configure/transmit the FFP-u through UE-initiated COT generation for the FFP assumed to be an FFP-g (the entire LBT-SB group/carrier group in the corresponding period) (or the UE may be allowed to perform only a shared COT transmission in the corresponding FFP period). This may be intended to prevent the UE transmission based on the UE-initiated COT from causing (UL-to-DL) interference with the BS-initiated COT/FFP. For example, collision/interference between the BS-initiated COT and the UE-initiated COT may be prevented.
iii. FIG. 15 illustrates an exemplary UE operation. Referring to FIG. 15, a UE operation method may vary depending on whether availability for a corresponding SB/carrier group has been indicated (e.g., by a GC-PDCCH) (E05). For example, the UE may receive availability indication information from the BS by specific signaling. The specific signaling may be, but not limited to, a PDCCH or a GC-PDCCH. In a more specific example, the availability indication information may be included in DCI format 2_0 delivered on the GC-PDCCH. The availability indication information may include one or two bits, and each of the bits may be related to an SB group/carrier group. For example, an nth bit may indicate availability for SB/carrier-group #n. When the UE receives an availability indication indicating that a corresponding SB/carrier group is available, the UE may operate based on a Rel-16 FFP-g for all SBs/carriers in at least the SB/carrier group (regardless of LBT) (E25). On the contrary, in the absence of the above availability indication (on the GC-PDCCH), the UE may operate based on the result of the LBT (performed in operation E10). For example, when a channel is determined to be busy in a specific SB/carrier as a result of the LBT (and a DL signal is detected from the BS in the specific SB/carrier), the UE may perform the Rel-16 FFP-g operation for all SBs/carriers of the SB/carrier group to which the corresponding SB/carrier belongs (E25).
B. Otherwise, only when the channel is determined to be idle in all LBT-SBs or all carriers as the result of the LBT for the LBT-SB group or carrier group (e.g., E10 in FIG. 15) (or no DL signal is detected from the BS in any of the LBT-SBs/carriers), and none of the LBT-SBs/carriers are indicated as available by the GC-PDCCH, the UE may start the FFP-u transmission in the UE-initiated COT in LBT-SBs/carriers (all or some LBT-SBs/carriers, for example, some LBT-SBs/carriers for which the LBT result indicates idle) in the LBT-SB group/carrier group (e.g., E20 in FIG. 15).
C. Additionally, in the case where for a scheduled UL (e.g., PUSCH or PUCCH) transmission, DCI indicates whether the UL transmission is a UE-initiated COT-based transmission or a shared-COT-based transmission (based on a BS-initiated COT) (a transmission type), and for a configured UL (e.g., PUSCH or PUCCH) transmission, it is determined whether the UL transmission is a UE-initiated COT-based transmission or a shared-COT-based transmission (based on a BS-initiated COT) (a transmission type) according to a specific rule (hereinafter, referred to as "RULE_#1"), the following UE operations may be considered.
i. When DCI indicates a shared-COT-based transmission for a specific scheduled UL resource, the UE may transmit the specific scheduled UL resource in the form of the shared-COT-based transmission, assuming that the BS has already started a BS-initiated COT-based transmission in an FFP-g period including the UL resource (while dropping DL signal detection), or only when the UE detects a DL signal (transmitted based on a BS-initiated COT) in the FFP-g including the UL resource, the UE may transmit the UL resource in the form of a shared-COT-based transmission (when the UE fails to detect the DL signal, the UE is not enabled to transmit the UL resource).
ii. In an example of RULE_#1, when a configured UL resource is indicated to be aligned with the starting time of a specific FFP-u period, a specific FFP-g period includes the starting time of the FFP-u period (or the configured UL resource), and the UE detects a DL signal (transmitted based on a BS-initiated COT) in the FFP-g, the UE may transmit the configured UL resource based on a shared-COT, and otherwise, based on a UE-initiated COT (this rule is defined as "C-UL rule-a", for convenience. C-UL rule-a may also be applied to RULE_#2, RULE_#3, and/or any RULE_#i which will be described later, not limited to RULE_#1).
iii. In an example of RULE_#1, when a configured UL resource is indicated to be aligned with the starting time of a specific FFP-u period, the UE may always transmit the configured UL resource based on a UE-initiated-COT (this rule is defined as "C-UL rule-b", for convenience. C-UL rule-b may also be applied to RULE_#2, RULE_#3, and/or any RULE_#i which will be described later, not limited to RULE_#1).
iv. In an example of RULE_#1, when a configured UL resource is indicated to be included in a specific FFP-u period without being aligned with the starting time of the FFP-u period, and the UE has already started to transmit a UE-initiated COT-based transmission in the FFP-u period, the UE may transmit the configured UL resource based on the UE-initiated COT. Otherwise, when a specific FFP-g period includes the configured UL resource, and the UE detects a DL signal (transmitted based on a BS-initiated COT) in the FFP-g, the UE may transmit the configured UL resource based on a shared-COT (this rule is defined as "C-UL rule-c", for convenience. C-UL rule-c may also be applied to RULE_#2, RULE_#3, and/or any RULE_#i which will be described later, not limited to RULE_#1).

v. In the case where RULE_#1 is applied to a specific configured UL resource in a specific carrier, carrier #1 at a specific time in the above state, when it is assumed that the configured UL transmission is a specific transmission type (e.g., UE-initiated COT-based transmission), and DCI indicates another transmission type (e.g., shared-COT-based transmission (without LBT)) for a specific scheduled UL transmission in another carrier, carrier #2 (adjacent to carrier #1 in frequency), the UE may apply the transmission type (e.g., shared-COT-based transmission) indicated by the DCI to the configured UL transmission (as well as the scheduled UL transmission). In another method, the UE may perform only the scheduled UL transmission, while dropping the configured UL transmission.
  1. In another method, when a transmission type determined to be assumed for the configured UL transmission is different from a transmission type indicated for the scheduled UL transmission by DCI in the above state, the UE may perform the shared-COT-based transmission for both of the UL transmissions (or the UE-initiated COT-based transmission for both of the UL transmissions).
D. Additionally, in the case where it is determined whether to perform a configured UL (e.g., PUSCH or PUCCH) transmission based on a UE-initiated COT or a shared-COT (a transmission type) according to a specific rule (hereinafter, referred to as "RULE_#2"), the following UE operations may be considered.
  i. In an example of RULE_#2, the afore-defined C-UL rule-a may be used. When a configured UL resource is indicated to be aligned with the starting time of a specific FFP-u period, a specific FFP-g period includes the starting time of the FFP-u period (or the configured UL resource), and the UE detects a DL signal in the FFP-g (transmitted based on a BS-initiated COT), the UE may transmit the configured UL resource based on a shared-COT, and otherwise, based on a UE-initiated COT.
  ii. In an example of RULE_#2, the afore-defined C-UL rule-b may be used. When a configured UL resource is indicated to be aligned with the starting time of a specific FFP-u period, the UE may always transmit the configured UL resource based on a UE-initiated-COT.
  iii. In an example of RULE_#2, the afore-defined C-UL rule-c may be used. When a configured UL resource is indicated to be included in a specific FFP-u period without being aligned with the starting time of the FFP-u period, and the UE has already started to transmit a UE-initiated COT-based transmission in the FFP-u period, the UE may transmit the configured UL resource based on a UE-initiated COT. Otherwise, when a specific FFP-g period includes the configured UL resource, and the UE detects a DL signal (transmitted based on a BS-initiated COT) in the FFP-g, the UE may transmit the configured UL resource based on a shared-COT.
  v. In the case where when RULE_#2 is applied to a specific configured UL resource, configured UL #1 in a specific carrier, carrier #1 at a specific time in the above state, it is determined that a specific transmission type (e.g., UE-initiated COT-based transmission) is assumed for configured UL #1, and when RULE_#2 is applied to a specific configured UL resource, configured UL #2 in another carrier, carrier #2 (adjacent to carrier #1 in frequency) at the same time, it is determined that another transmission type (e.g., shared-COT-based transmission) is assumed for configured UL #2, the UE may perform the shared-COT-based transmission for both of the UL transmissions (or the UE-initiated COT-based transmission for both of the UL transmissions). In another method, the UE may perform only the configured UL transmission determined to be a shared-COT-based transmission, while dropping the configured UL transmission determined to be a UE-initiated COT-based transmission, in the above situation.
E. Additionally, in the case where a configured UL (e.g., PUSCH or PUCCH) resource is configured to be aligned with the starting time of a specific FFP-u period, the following operation may be performed.
  i. When a specific FFP-g period includes the starting time of the FFP-u period (or the configured UL resource), and a specific DL resource (e.g., a semi-statically configured DL symbol) and/or a specific DL transmission (e.g., a periodically configured SSB (for SS/PBCH broadcasting) and/or a specific CORESET (e.g., having a lowest ID/index) and/or a TRS/CSI-RS transmission and/or a PDSCH transmission) in the FFP-g period or a period between the starting time of the FFP-g period and the configured UL resource is preconfigured/pre-indicated before the start of the FFP-g period, the UE may apply the afore-described rule C-UL rule-a to the configured UL resource.
  ii. Otherwise, (e.g., although the FFP-g period includes the starting time of the FFP-u period (or the configured UL resource), the specific DL resource and/or the DL transmission in the FFP-g period or the period between the starting time of the FFP-g period and the configured UL resource is not preconfigured/pre-indicated before the start of the FFP-g period), the UE may apply the afore-described rule C-UL rule-b to the configured UL resource.
F. Additionally, in the case where a configured UL (e.g., PUSCH or PUCCH) resource is configured to be aligned with the starting time of a specific FFP-u period, the following operation may be performed.
  i. When a specific FFP-g period includes the starting time of the FFP-u period (or the configured UL resource), and the interval between the starting time of the FFP-g period and the configured UL resource (or the starting offset of the FFP-u set based on an even radio frame index) is equal to or greater than a specific value, the UE may apply the afore-described rule C-UL rule-a to the configured UL resource. Otherwise (e.g., when the interval (or the FFP-u offset) is less than the specific value), the UE may apply the afore-described rule C-UL rule-b to the configured UL resource.
  ii. Alternatively, on the contrary, when the specific FFP-g period includes the starting time of the FFP-u period (or the configured UL resource), and the interval between the starting time of the FFP-g period and the configured UL resource (or the starting offset of the FFP-u set based on the even radio frame index) is less than the specific value, the UE may apply the afore-described rule C-UL rule-a to the configured UL resource. Otherwise (e.g., when the interval (or the FFP-u offset) is equal to or greater than the specific value), the UE may apply the afore-described rule C-UL rule-b to the configured UL resource.
G. Additionally, in the case where DCI indicates whether a scheduled UL (e.g., PUSCH or PUCCH) transmission is to be performed based on a UE-initiated COT or a shared-COT (a transmission type), the following UE operations may be considered.

i. When DCI indicates a specific transmission type (e.g., UE-initiated COT-based transmission) for a specific scheduled UL resource, scheduled UL #1 in a specific carrier, carrier #1 at a specific time point, and DCI indicates another transmission type (e.g., shared-COT-based transmission (without LBT)) for a specific scheduled UL resource, scheduled UL #2 in another carrier, carrier #2 (adjacent to carrier #1 in frequency) at the same time point, the UE may perform the shared-COT-based transmission for both of the UL resources (or the UE-initiated COT-based transmission for both of the UL resources). In another method, the UE may perform only the scheduled UL transmission indicated as a shared-COT-based transmission, while dropping the scheduled UL transmission indicated as a UE-initiated COT-based transmission in the above situation.
1. In another method, when the DCIs indicate different transmission types for scheduled UL #1 and scheduled UL #2 in the above same state, the UE may apply the transmission type indicated by the DCI received later (out of the two DCIs) for both of the two UL resources (or the transmission type indicated by the DCI received earlier).

In another method, the UE may perform only the scheduled UL transmission indicated by the DCI received later, while dropping the scheduled UL transmission indicated by the DCI received earlier in the above situation.

H. Additionally, in the case where non-fallback DCI (DCI format 0_1 or 0_2) indicates whether a UL (i.e., non-fallback UL) transmission scheduled by the non-fallback DCI is a UE-initiated COT-based transmission or a shared-COT-based transmission (a transmission type), and it is determined whether a UL transmission scheduled by fallback DCI (e.g., DCI format 0_0) is a UE-initiated COT-based transmission or a shared-COT-based transmission (a transmission type) according to a specific rule (hereinafter, referred to as "RULE_#3"), the following UE operations may be considered.
  i. In an example of RULE_#3, when a scheduled UL resource is indicated to be aligned with the starting time of a specific FFP-u period, a specific FFP-g period includes the starting time of the FFP-u period (or the scheduled UL resource), and the UE detects a DL signal in the FFP-g (transmitted based on a BS-initiated COT), the UE may transmit the scheduled UL resource based on a shared-COT, and otherwise, based on a UE-initiated COT (this rule is defined as "S-UL rule-a", for convenience).
  iii. In an example of RULE_#3, when a scheduled UL resource is indicated to be aligned with the starting time of a specific FFP-u period, the UE may always transmit the scheduled UL resource based on a UE-initiated-COT (this rule is defined as "S-UL rule-b").
  iv. In an example of RULE_#3, when a scheduled UL resource is indicated to be included in a specific FFP-u period without being aligned with the starting time of the FFP-u period, and the UE has already started a UE-initiated COT-based transmission in the FFP-u period, the UE may transmit the scheduled UL resource based on the UE-initiated COT. Otherwise, when the specific FFP-g period includes the scheduled UL resource, and the UE detects a DL signal (transmitted based on a BS-initiated COT) in the FFP-g, the UE may transmit the scheduled UL resource based on a shared-COT (this rule is defined as "S-UL rule-c").
  iv. In the case where RULE_#3 is applied to a specific fallback UL transmission in a specific carrier, carrier #1 at a specific time point in the above state, when it is determined to assume a specific transmission type (e.g., UE-initiated COT-based transmission) for the fallback UL transmission, and DCI indicates another transmission type (e.g., shared-COT-based transmission (without LBT)) for a specific non-fallback UL transmission in another carrier, carrier #2 (adjacent to carrier #1 in frequency), the UE may apply the transmission type (e.g., shared-COT-based transmission) indicated by the DCI to the fallback UL transmission (as well as the non-fallback UL transmission). In another method, the UE may perform only the non-fallback UL transmission, while dropping the fallback UL transmission.
1. In another method, when a transmission type determined to be assumed for the fallback UL transmission is different from a transmission type indicated for the non-fallback UL transmission by DCI in the above same state, the UE may perform the shared-COT-based transmission for both of the UL transmissions (or the UE-initiated COT-based transmission for both of the UL transmissions).
I. Additionally, in the case where DCI indicates whether to perform a scheduled UL (e.g., PUSCH or PUCCH) transmission based on a UE-initiated COT or a shared-COT (a transmission type), the following operations may be performed.
  i. When the scheduled UL resource is indicated to be aligned with the starting time of a specific FFP-u period, the UE may transmit the scheduled UL resource by applying the transmission type (e.g. UE-initiated COT-based transmission or shared-COT-based transmission) indicated by the DCI.
  ii. Otherwise (when the scheduled UL resource is indicated not to be aligned with the starting time of the specific FFP-u period or is not indicated to be aligned with the starting time of the specific FFP-u period), the UE may apply the afore-described rule S-UL rule-c to the scheduled UL resource (while ignoring the transmission type indicated by the DCI).
J. Additionally, in the case where DCI indicates whether a scheduled UL (e.g., PUSCH or PUCCH) transmission is to be performed based on a UE-initiated COT or a shared-COT (a transmission type), the following operations may be performed.
  i. When the scheduled UL resource is indicated to be aligned with the starting time of a specific FFP-u period, the UE may transmit the scheduled UL resource by applying a transmission type (e.g. UE-initiated COT-based transmission or shared-COT-based transmission) indicated by the DCI.
  ii. Otherwise (when the scheduled UL resource is indicated not to be aligned with the starting time of the specific FFP-u period or is not indicated to be aligned with the starting time of the specific FFP-u period), the UE may transmit the scheduled UL resource based on a shared-COT, if the DCI indicates a shared-COT-based transmission as a transmission type. If the DCI indicates a UE-initiated COT-based transmission as the transmission type, the UE may apply the afore-described rule S-UL rule-c to the scheduled UL resource.
K. Additionally, in the case where it is not explicitly indicated by DCI whether to perform a scheduled UL (e.g., PUSCH or PUCCH) transmission based on a UE-initiated COT or a shared-COT (a transmission type), the following operations may be performed.

i. When the DCI indicates dropping of an LBT operation (i.e., no LBT), the UE may transmit the scheduled UL resource based on the shared-COT.
ii. Otherwise (when the DCI indicates an LBT operation), if the scheduled UL resource is indicated to be aligned with the starting time of a specific FFP-u period, the UE may apply the afore-described rule S-UL rule-a or S-UL rule-b (to the scheduled UL resource). Otherwise, when the scheduled UL resource is indicated not to be aligned with the starting time of the specific FFP-u period or is not indicated to be aligned with the starting time of the specific FFP-u period, the UE may apply the afore-described rule S-UL rule-c (to the scheduled UL resource).

L. In the case where a configured (and/or scheduled) UL resource, UL #1 which has been configured/indicated to be aligned with the starting time of an FFP-u period, is determined/operated to be transmitted based on a UE-initiated COT by applying the afore-described rule, C-UL rule-b or C-UL rule-a (and/or S-UL rule-b or S-UL rule-a) to the UL resource, when a specific scheduled (and/or configured) UL resource, UL #2 is indicated/configured to overlap with the idle period of an FFP-u shortly before UL #1, the UE may assume/perform a shared-COT-based transmission for UL #1, exceptionally without assuming/performing a UE-initiated-COT based transmission (or the UE may not be allowed to transmit UL #1).
i. The above operation may be equally applied to a situation in which the rule, C-UL rule-a (and/or S-UL rule-a) is applied to UL #1.
ii. The operation may always be applied regardless of whether the UE has transmitted UL #2, dropped the transmission of UL #2, or failed in the transmission of UL #2. Alternatively, only when the UE has actually transmitted UL #2, the operation may be applied, whereas when the UE has dropped or failed in the transmission of UL #2, the UE may assume/perform a UE-initiated COT-based transmission for UL #2 by applying the rule C-UL rule-b (and/or S-UL rule-b) to UL #1 (or the UE may transmit UL #1 by applying the rule C-UL rule-a (and/or S-UL rule-a).
iii. Alternatively, in the case where the UE is configured to apply the rule, C-UL rule-b or C-UL rule-a (and/or S-UL rule-b or S-UL rule-a) to the configured (and/or scheduled) UL resource, UL #1, when a specific scheduled (and/or configured) UL resource, UL #2 is indicated/configured to be shortly before UL #1, apart from UL #1 by a gap equal to or less than X usec (e.g. X=9, 16, or 25), the UE may assume/perform a shared-COT-based transmission for UL #1, exceptionally without assuming/performing a UE-initiated-COT based transmission (or the UE may not be allowed to transmit UL #1).
1. The above UE operation may be equally applied to a situation in which the rule, C-UL rule-a (and/or S-UL rule-a) is applied to UL #1.
2. The operation may always be applied regardless of whether the UE has transmitted UL #2, dropped the transmission of UL #2, or failed in the transmission of UL #2. Alternatively, only when the UE has actually transmitted UL #2, the operation may be applied, whereas when the UE has dropped or failed in the transmission of UL #2, the UE may assume/perform a UE-initiated COT-based transmission for UL #2 by applying the rule C-UL rule-b (and/or S-UL rule-b) to UL #1 (or the UE may transmit UL #1 by applying the rule, C-UL rule-a (and/or S-UL rule-a).

M. In the case where DCI indicates a shared-COT-based transmission for a scheduled UL resource scheduled to be aligned with the starting time of an FFP-u period, when a specific FFP-g period includes the starting time of the FFP-u period (or the scheduled UL resource), and the UE detects a DL signal (transmitted based on a BS-initiated COT) in the FFP-g, the UE may perform the shared-COT-based transmission in the scheduled UL resource, and otherwise, the UE may not be allowed to transmit the scheduled UL resource.
i. Additionally, in the case where DCI indicates a UE-initiated COT-based transmission for a scheduled UL resource scheduled to be included in an FFP-u period without being aligned with the starting time of the FFP-u period, when the UE has already started a UE-initiated COT-based transmission in the FFP-u period, the UE may perform the UE-initiated COT-based transmission in the scheduled UL resource, and otherwise (i.e., when the UE has not started the UE-initiated COT-based transmission in the FFP-u period), the UE may drop the transmission of the scheduled UL resource (i.e. the corresponding transmission may not be allowed).

N. In another method, in the case where DCI indicates a shared-COT-based transmission for a scheduled UL resource scheduled to be aligned with the starting time of an FFP-u period, when the UE detects a DL signal (transmitted based on a BS-initiated COT) by applying S-UL rule-a (and/or C-UL rule-a) to the UL resource, the UE may perform the shared-COT-based transmission in the scheduled UL resource, and otherwise, the UE may perform a UE-initiated COT-based transmission in the scheduled UL resource.
i. Only when the scheduled UL resource and the DCI that schedules the scheduled UL resource are transmitted in different FFP-g periods, the above UE operation may be applied. Otherwise (e.g., when the scheduled UL resource and the DCI that schedules the scheduled UL resources are transmitted in the same FFP-g period), the UE may be allowed/enabled to perform only the shared-COT-based transmission (based on the DL signal detection) in the UL resource (indicated to be transmitted based on the shared-COT by the DCI). When the DCI indicates a UE-initiated COT-based transmission for the scheduled UL resource, the UE may perform the UE-initiated COT-based transmission (as indicated by the DCI), and this operation may always be applied regardless of whether the scheduled UL resource and the DCI that schedules the scheduled UL resources are transmitted in the same or different FFP-g periods.
ii. Additionally, in the case where DCI indicates a UE-initiated COT-based transmission for a scheduled UL resource configured to be included in an FFP-u period without being aligned with the starting time of the FFP-u period, when the UE has already started the UE-initiated COT-based transmission by applying S-UL rule-c (and/or C-UL rule-c) to the corresponding UL resource, the UE may perform the UE-initiated COT-based transmission, and otherwise, when the UE has detected a DL signal (transmitted based on a BS-initiated COT), the UE may perform a shared-COT-based transmission.
1. Only when the scheduled UL resource and the DCI that schedules the scheduled UL resource are transmitted in different FFP-g periods, the above UE operation may be applied. Otherwise (e.g., when the scheduled UL resource and the DCI that schedules the scheduled UL resource are transmitted in the same FFP-g period), the UE may be allowed/enabled to perform only the UE-initiated COT-based transmission in the corresponding UL resource (indicated to be transmitted based on the UE-initiated COT by the DCI). When the DCI indicates a shared-COT-based transmission for the scheduled UL resource, the UE may perform the shared-COT-based transmission (as indicated by the DCI), and this operation may always be applied regardless of whether the scheduled UL resource and the DCI that schedules the scheduled UL resource are transmitted in the same or different FFP-g periods.

iii. In another method, in the case where DCI indicates a UE-initiated COT-based transmission or a shared-COT-based transmission for a scheduled UL resource configured to be included in an FFP-u period without being aligned with the starting time of the FFP-u period, when the UE has already started the UE-initiated COT-based transmission by applying S-UL rule-c (and/or C-UL rule-c) to the corresponding UL resource without applying (while ignoring) the DCI indication, the UE may perform the UE-initiated COT-based transmission, and otherwise, when the UE has detected a DL signal (transmitted based on a BS-initiated COT), the UE may perform the shared-COT-based transmission.

1. Only when the scheduled UL resource and the DCI that schedules the scheduled UL resource are transmitted in different FFP-g periods, the above UE operation may be applied. Otherwise (e.g., when the scheduled UL resource and the DCI that schedules the scheduled UL resource are transmitted in the same FFP-g period), the UE may transmit the scheduled UL resource based on a transmission type (e.g., UE-initiated COT-based transmission or shared COT-based transmission) indicated by the DCI (as indicated by the DCI).

O. For a configured (and/or scheduled) UL resource configured/indicated to be aligned with the starting time of an FFP-g period (and/or after a predetermined time or less from the starting time), only a UE-initiated COT-based transmission may be allowed/enabled.

i. This may be because to perform a shared-COT-based UL transmission, a (minimum) processing time of the UE required to detect a DL signal (transmitted based on a BS-initiated COT) should be secured before the UL transmission.

ii. Accordingly, for a configured (and/or scheduled) UL resource configured/indicated not to be aligned with the starting time of an FFP-g period (and/or after a time greater than a specific time from the starting time), the UE may transmit the UL resource based on a shared-COT or a UE-initiated COT according to a situation by applying the rule C-UL rule-a (and/or S-UL rule-a), C-UL rule-b (and/or S-UL rule-b), or C-UL rule-c (and/or S-UL rule-c) or based on an indication of DCI.

P. When the UE performs a transmission in a configured (and/or scheduled) UL resource configured/indicated to be aligned with the starting time of an FFP-u period (and/or after a specific time or less from the starting time) by applying the rule, C-UL rule-a (and/or S-UL rule-a), CP extension applied to/performed for transmission of the UL resource and/or parameter value(s) for the CP extension (e.g., the following CP extension operations (i.e., CPE behavior ½)) may be determined/configured/applied differently, depending on whether the UL resource is transmitted based on a shared-COT (based on a BS-initiated COT) or a UE-initiated COT.

i. CPE behavior 1: The UE may perform CP extension by using/applying a CP extension parameter value (e.g., extended CP length) configured by the BS or by using/applying a specific candidate CP extension parameter value indicated by DCI from among a plurality of preconfigured candidate CP extension parameter values (e.g., a candidate CPE value set).

ii. CPE behavior 2: CP extension may be performed (by determining/applying an extended CP length) so that a signal starting time of a UL resource accurately matches to the starting time of an FFP-u.

iii. When the UE determines a shared-COT-based transmission for a configured (and/or scheduled) UL resource by applying the rule, C-UL rule-a (and/or S-UL rule-a), the UE may apply CPE behavior 1, whereas when the UE determines a UE-initiated-COT-based transmission, the UE may apply CPE behavior 2.

1. When the UE determines a UE-initiated COT-based transmission for the configured (and/or scheduled) UL resource by applying the rule, C-UL rule-b (and/or S-UL rule-b), the UE may apply CPE behavior 2.

iv. Additionally, when DCI indicates a shared-COT-based transmission for a scheduled UL resource scheduled to be aligned with the starting time of an FFP-u period (and/or after a specific time or less from the starting time), the UE may apply CPE behavior 1, whereas when DCI indicates a UE-initiated COT-based transmission, the UE may o apply CPE behavior 2 (while ignoring a CPE parameter value indicated by the DCI).

v. Additionally, when the UE determines a shared-COT-based transmission for a configured (and/or scheduled) UL resource configured/indicated to be included in an FFP-u period without being aligned with the starting time of the FFP-u period by applying the rule, C-UL rule-c (and/or S-UL rule-c), the UE may apply CPE behavior 1, whereas when the UE determines a UE-initiated COT-based transmission, the UE may apply CPE behavior 2.

1. Alternatively, in this case, the UE may apply CPE behavior 1 for both of the case where the shared-COT-based transmission is determined for the UL resource and the case where the UE-initiated COT-based transmission is determined for the UL resource.

vi. Additionally, when DCI indicates a shared-COT-based transmission for a scheduled UL resource scheduled to be included in an FFP-u period without being aligned with the starting time of the FFP-u period, the UE may apply CPE behavior 1, whereas when the DCI indicates a UE-initiated COT-based transmission for the scheduled UL resource, the UE may apply CPE behavior 2 (while ignoring a CPE parameter value indicated by the DCI).

1. Alternatively, in this case, the UE may apply CPE behavior 1 for both of the case where a shared-COT-based transmission is determined for the UL resource and the case where a UE-initiated COT-based transmission is determined for the UL resource.

Q. (For a specific FFP period/starting time) an LBT-SB group/carrier group for which the UE performs LBT may be determined to be all of a plurality of LBT-SBs configured/constructed in one carrier (and/or a plurality of intra-band carriers) or a plurality of intra-band carriers, or may be determined as/limited to LBT-SBs/carriers in which the UE is to perform an actual UL channel/signal transmission or LBT-SBs/carriers configured/indicated for a UL channel/signal transmission from the UE (for the corresponding FFP period/starting time). For example, when there are LBT-SB groups/carrier groups #0 to #N in the system, and the UE intends to perform a UL channel/signal transmission or is configured/indicated to perform a UL channel/signal transmission in some of LBT-SB groups/carrier groups #0 to #N (hereinafter, referred to specific LBT-SB group(s)/carrier group(s)), the UE may be allowed to start the FFP-u transmission in a UE-initiated COT, based on the entre specific LBT-SB group(s)/carrier group(s) being idle.

R. In further generalization, to start a corresponding FFP-u transmission in a UE-initiated COT in the presence of LBT-SB groups/carrier groups #0 to #N in the system, at least some LBT-SB group(s)/carrier group(s) in which LBT idle should be confirmed may be configured for/indicated to/determined for the UE. For example, based on the LBT result of the specific LBT-SB group(s)/carrier group(s) being confirmed as idle, the UE may be allowed to start the FFP-u transmission in the UE-initiated COT, restrictively for the specific LBT-SB group(s)/carrier group(s) or for LBT-SB/carrier groups including the specific LBT-SB/carrier group(s). When the UE starts the FFP-u transmission in this manner, the LBT-SB/carrier group(s) may be defined to necessarily include a corresponding UL signal. For example, the LBT-SB/carrier group(s) may be configured cell-commonly/UE-group commonly, or predefined.

5) Additionally, in the case where the UE is configured with a plurality of LBT-SBs (e.g., an RB set (+guard RBs)) and/or a plurality of carriers (e.g., in a situation where the UE operates only in a BS-initiated COT-based FFP-g in the same/similar manner as to legacy Rel-16 or in the state where the UE is not configured with UE-initiated COT-based FFP-u-related parameters (e.g., a period and a starting offset), the following operations may be considered for a UL transmission in the form of a shared-COT-based UL transmission based on a BS-initiated COT.

A. In the case where an LBT-SB group including a plurality of LBT-SBs in one carrier (and/or a plurality of intra-band carriers), a carrier group including a plurality of intra-band carriers, or an LBT-SB group/carrier group indicated as available by the same bit of a corresponding PDCCH when availability is indicated for an LBT-SB/carrier by specific signaling (e.g., a GC-PDCCH) is given/configured, when specific LBT-SB #1/carrier #1 is indicated as available by the GC-PDCCH (e.g., transmitted in a licensed band), and a DL signal is detected from the BS in at least one other LBT-SB #2/carrier #2 within the LBT-SB group/carrier group to which LBT-SB #1/carrier #1 belongs, the UE may be enabled/allowed to perform a shared-COT-based (UL) transmission (based on a BS-initiated COT) for a UL resource (e.g., (CG) PUSCH, PRACH, or PUCCH) configured in LBT-SB #1/carrier #1.

i. In this case, the UE may perform a UL transmission in LBT-SB #1/carrier #1 (by determining a DL-to-UL gap and performing 16-usec or 25-usec LBT according to the size of the gap) based on a detection time of a DL signal in LBT-SB #2/carrier #2.

B. Otherwise, in the case where the specific LBT-SB/carrier, LBT-SB #1/carrier #1 is indicated as available by the GC-PDCCH (e.g., transmitted in the licensed band), when a DL signal is detected from the BS in none of the other LBT-SBs/carriers within the LBT-SB group/carrier group to which LBT-SB #1/carrier #1 belongs, the UE may not be allowed to perform the shared-COT-based (UL) transmission (based on the BS-initiated COT) for the UL resource (e.g., (CG) PUSCH, PRACH, or PUCCH) configured in LBT-SB #1/carrier #1.

C. In the above example, (for a specific FFP period/starting time) an LBT-SB group/carrier group for which the UE performs LBT may be determined to be all of a plurality of LBT-SBs configured/constructed in one carrier (and/or a plurality of intra-band carriers) or a plurality of intra-band carriers, or may be determined as/limited to LBT-SBs/carriers in which the UE is to perform an actual UL channel/signal transmission or LBT-SBs/carriers configured/indicated for a UL channel/signal transmission from the UE (for a specific FFP period/starting time). For example, when there are LBT-SB groups/carrier groups #0 to #N in the system, and the UE intends to perform a UL channel/signal transmission or is configured/indicated to perform a UL channel/signal transmission in some of LBT-SB groups/carrier groups #0 to #N (hereinafter, referred to specific LBT-SB group(s)/carrier group(s)), the UE may be allowed to start the FFP-u transmission in a UE-initiated COT based on the entire specific LBT-SB group(s)/carrier group(s) being idle.

D. In further generalization, to start a corresponding FFP-u transmission in a UE-initiated COT in the presence of LBT-SB groups/carrier groups #0 to #N in the system, at least some LBT-SB group(s)/carrier group(s) in which LBT idle should be confirmed may be configured for/indicated to/determined for the UE. For example, based on the LBT result of some LBT-SB group(s)/carrier group(s) being confirmed as idle, the UE may be allowed to start the FFP-u transmission in the UE-initiated COT, restrictively for the specific LBT-SB group(s)/carrier group(s) or for LBT-SB/carrier groups including the specific LBT-SB/carrier group(s). When the UE starts the FFP-u transmission in this manner, the LBT-SB/carrier group(s) may be defined to necessarily include a corresponding UL signal. For example, the LBT-SB/carrier group(s) may be configured cell-commonly/UE-group commonly, or predefined.

Figure 16A:
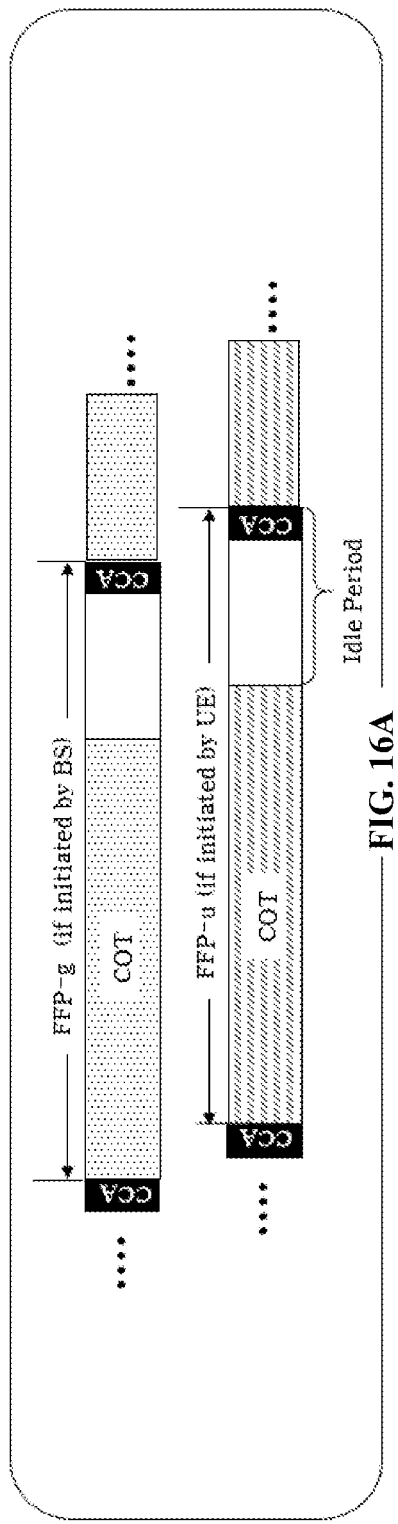
FIGS. 16A to 16C are diagrams illustrating fixed frame periods (FFPs) according to embodiments of the present disclosure.

6) In an example of an FFP-g and an FFP-u, the starting time of the FFP-g may be set to be earlier than that of the FFP-u (in a corresponding period in the state where the gap between the starting times of the FFP-g and the FFP-u is set to be less than {0.5*FFP period}) (e.g., FIG. 16A).

Figure 16B:
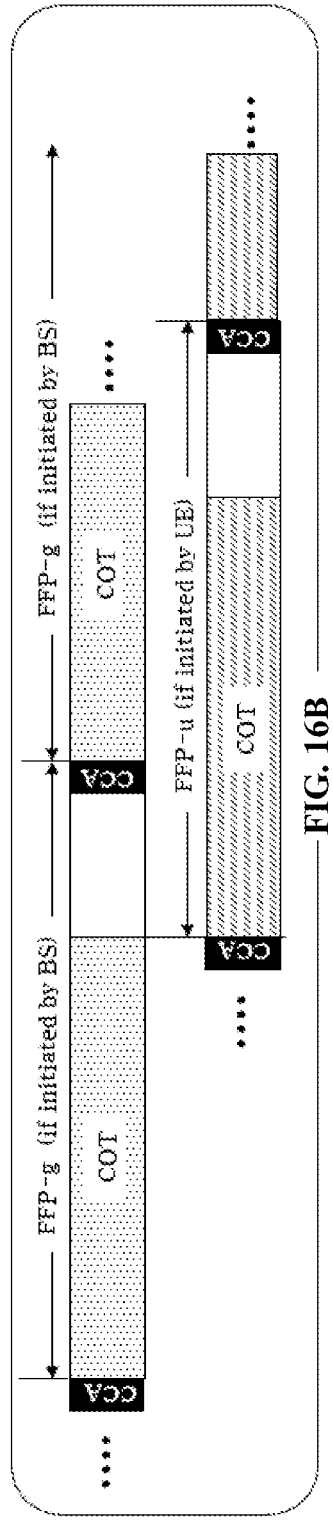
Figure 16C:
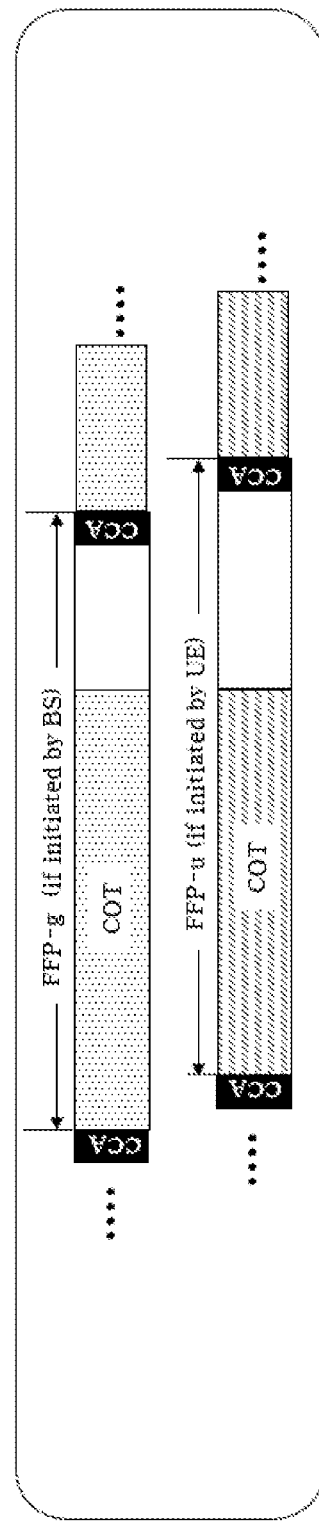

A. For example, the starting time of the FFP-g may be set to be earlier than the starting time of the FFP-u by {25 usec+a, 9 usec+a, or 16 usec+a} or an equivalent number of OFDM symbols.

i. On the contrary, the starting time of the FFP-u may be set to be aligned with the starting time of the idle period of the FFP-g (e.g., FIG. 16B).

B. Additionally, in the case where the starting/ending time of the idle period of the FFP-g is given (as defined in legacy Rel-16), the starting time of the FFP-u may be configured to be aligned with the starting time of the idle period of the FFP-g (in the state where the starting time of the FFP-u is configured not to be aligned with the starting time of the FFP-g) (e.g., FIG. 16A).

7) The following methods may be considered to configure/signal an FFP starting time and an FFP duration/ period for an FFP-u of the UE. For reference, for an FFP-g in the legacy Rel. 16 NR system, an FFP starting time is set by starting offset=0 based on an even radio frame number, and an FFP-g period (starting period) and an FFP duration (occupied period) are set equal.

A. The granularity of the starting offset of an FFP-u may be configured/predefined as one of {OFDM symbol unit, slot unit, msec (and/or usec) unit} or as a combination of two (or three) of the units. Information about an actual starting offset based on the corresponding granularity may be configured for/indicated to the UE, explicitly/implicitly.
  i. For example, on the assumption that a symbol-level granularity is used for the starting offset of an FFP-u (e.g., FIG. 20), an actual starting offset value may be configured/indicated as X symbols. Various other granularities may be used for a starting offset. For example, the starting offset may be configured as Y slots, Z msec (and/or usec), {Y slots+X symbols}, or {Z msec (and/or usec)+X symbols}.
  ii. According to a more specific embodiment, the starting offset value of an FFP-u (particularly in symbols or slots) may vary depending on an SCS size. For example, when a set of symbol-level or slot-level starting offset values configurable for an SCS of N KHz are given as {a, b, c}, a set of configurable offset values for an SCS of (N×2K) KHz may be given as {a×2K, b×2K, c×2K}. In a more specific example, on the assumption that a first value is indicated/configured as a starting offset to/for the UE, the first value may be interpreted as L1 symbols for SCS1, and as L2 symbols for SCS2 different from SCS1. L1 and L2 may be different natural numbers. L1 and L2 may be set such that a total time duration (length) corresponding to SCS1-based L1 symbols is equal to a total time duration (length) corresponding to SCS2-based L2 symbols. For example, even though a plurality of UEs operate based on different SCSs, the plurality of UEs may have the same understanding of the starting time and period of an FFP-u in the time domain. For example, regarding the starting offset and period (e.g., a COT, an idle period, and/or a CCA slot) of an FFP-u, time alignment may be possible between UE1 operating based on SCS1 and UE2 operating based on SCS2. For example, the BS/network may configure/indicate/signal information about the starting offset and period of an FFP-u commonly for/to a plurality of UEs (UE groups), thereby reducing overhead, compared to UE-specific signaling. An SCS which the starting offset and period of the FFP-u indicated by the BS/network are based on may be configured/predefined, and this SCS may be referred to as a reference SCS.
  iii. When a symbol-level granularity is used for an FFP-u, the efficiency and scheduling flexibility of a configured grant UL (e.g., CG PUSCH) defined in the current NR system may be guaranteed. For a configured grant UL operation, the start of a UL resource is preconfigured/pre-allocated at the symbol level. If the FFP-u has a granularity at a larger level than the symbol level, for example, at the slot level, some configured UL resource(s) may not be available for the FFP-u due to misalignment between the configured UL resource(s) and the FFP-u. Therefore, the efficiency of resources, scheduling flexibility, and/or low-latency performance may be decreased. Accordingly, it is preferable to configure/define the granularity of the starting offset of the FFP-u at the symbol level.

Figure 17:
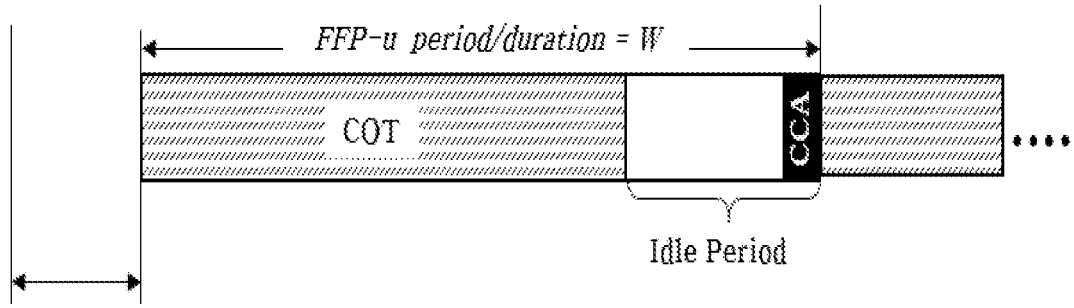
FIG. 17 is a diagram illustrating an FFP starting offset and an FFP duration according to an embodiment of the present disclosure.

B. The upper limit of the starting offset of the FFP-u may be determined based on the period (duration) of the FFP-u. When the period of the FFP-u is set to W, the starting offset of the FFP-u may be set/selected from among values equal to or 0 and less than W. For example, referring to FIG. 17, the starting offset of the FFP-u may be set below the period W of the FFP-u. In a more specific example, when the period of the FFP-u is set to W1 msec (and/or usec), the starting offset of the FFP-u may be set to one of M candidate offset values within a range of 0 to below W1 msec (and/or usec).
  i. In this case, M candidate offset values may be defined equally for each of different W1 values. As the value of W1 increases/decreases, the interval between adjacent candidate offset values may be set to further increase/decrease.
  ii. For example, when for W1=A, a set of configurable candidate offset values is given as {a, b, c}, a set of configurable candidate offset values may be given as {a×K, b×K, c×K} for W1=(A×K).
  iii. In another method, when the period of an FFP-g (or the maximum or minimum between the period of the FFP-g and the period of the FFP-u) is set to W2 msec (and/or usec) (regardless of the period set for the FFP-u), the starting offset of the FFP-u may be set to one of L candidate offset values within a range of 0 to below W2 msec (and/or usec). In this case, L candidate offset values may also be equally defined for each of different W2 values, and as the value of W2 increases/decreases, the interval between adjacent candidate offset values may be set to further increase/decrease, similarly to the above example.

C. In the case where the period of the FFP-g is set to W3 msec (and/or usec), the period of the FFP-u may be set to one of K candidate period values corresponding to factors of W3, including W3 msec (and/or usec).
  i. In this case, K candidate period values may be defined equally for each of different W3 values. As the value of W3 increases/decreases, the interval between adjacent candidate period values may be set to further increase/decrease.
  ii. For example, when for W3=B, a set of configurable candidate period values is given as {a, b, c}, a set of configurable candidate period values may be given as {a×K, b×K, c×K} for W3=(B×K).
  iii. According to the above description, the period of the FFP-u may be set only to a factor of the period of the FFP-g, not a value other than the factor.

D. A period for a periodic (P) or semi-persistent (SP) UL signal/channel (e.g. CG PUSCH, P/SP-CSI, SR, P/SP-SRS, or PRACH) transmission may be set only to 1) a value equal to the period of the FFP-u, 2) a factor of the period of the FFP-u, or 3) a multiple of the FFP-u period.
  i. According to the above description, (the period of the P/SP-UL signal/channel) may not be set to a value other than a factor or a multiple of the FFP-u period.

E. For the period (e.g., starting period) and duration (e.g., occupied period) of the FFP-u, the period P of the FFP-u may be set to a value greater than the duration D of the FFP-u (e.g., such that P is a multiple of D) (unlike the existing FFP-g).
  i. For example, for the FFP-g, period=duration=C msec (and/or usec) as is done conventionally, whereas for the FFP-u, duration=C msec (and/or usec) and period=C×K msec (and/or usec) (e.g. K>=1).

ii. This setting may enable more stable DL transmission from the perspective of the BS, because although the FFP-g and the FFP-u overlap with each other in a specific FFP period, only the FFP-g exists (without overlap with the FFP-u) in the remaining FFP period.

8) FFP-g period and FFP-u period combinations configurable for the UE may be confined/limited in the following method.

A. The following Table 8 lists a total of 36 period combinations that may be produced with 6 FFP-g periods and 6 FFP-u periods.
  i. In Table 8, the FFP-g period and the FFP-u period are equal or in a multiple/factor relationship in 24 combinations marked with "O".
  ii. In Table 8, the least common multiple between the FFP-g period and the FFP-u period is 5 msec (e.g., the overlapping pattern between the FFP-g and the FFP-u is repeated every 5 msec) in 2 combinations marked with "P5".
  iii. In Table 8, the least common multiple between the FFP-g period and the FFP-u period is 10 msec (e.g., the overlapping pattern between the FFP-g and the FFP-u is repeated every 10 msec) in 4 combinations marked with "P10".
  iv. In Table 8, the least common multiple between the FFP-g period and the FFP-u period is 20 msec (e.g., the overlapping pattern between the FFP-g and the FFP-u is repeated every 20 msec) in 6 combinations marked with "P20".
  v. In Table 8, the overlapping pattern period includes 5 FFP-g's and 2 FFP-u's or 2 FFP-g's and 5 FFP-u's in 6 combinations marked with "5:2".
  vi. In Table 8, the overlapping pattern period includes 5 FFP-g's and 4 FFP-u's or 4 FFP-g's and 5 FFP-u's in 4 combinations marked with "5:4".
  vii. In Table 8, the overlapping pattern period includes 5 FFP-g's and 8 FFP-u's or 8 FFP-g's and 5 FFP-u's in 2 combinations marked with "5:8".
  vii. As the least common multiple between the FFP-g period and the FFP-u period, that is, the overlapping pattern period between the FFP-g and the FFP-u decreases, the repeating pattern period of an LBT sensing time of the UE/BS and an idle period decreases, thereby relatively reducing the operation complexity of the UE/BS.
  ix. As the number of FFP-u's and/or FFP-g's included in the overlapping pattern period between the FFP-g and the FFP-u decreases, the repeating pattern period of an LBT sensing time of the UE/BS and an idle period decreases, thereby relatively reducing the operation complexity of the UE/BS.
  x. Further, considering the characteristics of UL data traffic of a URLLC UE requiring low latency, there may be a need for setting an FFP-u period to a small value.

TABLE 8

| | | \multicolumn{6}{c}{FFP-g Period (msec)} | | | | | |
|---|---|---|---|---|---|---|---|
| | | 1 | 2 | 2.5 | 4 | 5 | 10 |
| FFP-u_period (msec) | 1 | O | O | P5 (5:2) | O | O | O |
| | 2 | O | O | P10 (5:4) | O | P10 (5:2) | O |
| | 2.5 | P5 (5:2) | P10 (5:4) | O | P20 (5:8) | O | O |
| | 4 | O | O | P20 (5:8) | O | P20 (5:4) | P20 (5:2) |
| | 5 | O | P10 (5:2) | O | P20 (5:4) | O | O |
| | 10 | O | O | O | P20 (5:2) | O | O |

B. The FFP-g/FFP-u period combinations configurable for the UE based on the above Table 8 may primarily include 24 combinations corresponding to "O" and further include the following X combinations among the remaining 12 combinations (e.g., it may be regulated that the remaining combinations except for the 24+K combinations should not be configured for the UE).
  i. Method 1: Combinations corresponding to "P5" (X=2)
  ii. Method 2: Combinations corresponding to "P5" or "P10" (X=6)
  iii. Method 3: Combinations corresponding to "5:2" (X=6)
  iv. Method 4: Combinations corresponding to "5:2" or "5:4" (X=10)
  v. Method 5-1: Combinations with FFP-u period of 1 msec (X=1)
  vi. Method 5-2: Combinations with FFP-u period of 1 msec and FFP-g period of 1 msec (X=2)
  vii. Method 6-1: Combinations with FFP-u period of 1 msec or 2 msec (X=3)
  viii. Method 6-2: Combinations with FFP-u period of 1 msec or 2 msec and FFP-g period of 1 msec or 2 msec (X=6)
  ix. Method 7-1: Combinations with FFP-u period of 1 msec, 2 msec, or 2.5 msec (X=6)
  x. Method 7-2: Combinations with FFP-u period of 1 msec, 2 msec, or 2.5 msec and FFP-g period of 1 msec, 2 msec, or 2.5 msec (X=8)
  xi. Method 8: Combinations in relationship of FFP-u period<FFP-g period (X=6)

[Proposal 2]

1) It may be indicated to the UE whether a UE-initiated COT generation operation is allowed for an FFP (i.e. FFP_n) configured at a specific time by specific signaling transmitted in an FFP (i.e., FFP_n-k) configured before FFP-n.
A. When it is indicated that the UE-initiated COT generation operation is allowed, the UE may perform (e.g., 25-usec, 9-usec, or 16-usec) LBT shortly before the starting time of FFP_N.
  i. When determining that a channel is idle as a result of the LBT, the UE may start to transmit FFP_n in a UE-initiated COT.
  ii. Otherwise, when determining that the channel is busy, a UE operation may be defined, in which the UE performs the Rel-16 operation, assuming an FFP-n transmission structure starting with a BS-initiated COT, or the UE performs no transmission (and/or reception) in the FFP-n period.
B. When it is indicated that the UE-initiated COT is not allowed, the UE may perform the Rel-16 operation, assuming the FFP-n transmission structure starting with the BS-initiated COT.

C. Additionally, information about a maximum time duration allowed for the UE-initiated COT may be configured by RRC signaling or indicated by DCI (and/or MAC) signaling.

2) For the purpose of effective COT transmissions between a plurality of UEs (and/or between the UE and the BS) in TDM that minimizes collision between the COT transmissions, the following operations may be considered in a method of configuring/indicating a maximum time duration for a UE-initiated COT-based transmission.

A. A maximum time duration (referred to as a "max COT duration" for convenience) for a UE-initiated COT-based transmission allowed in one FFP-u period may be configured/indicated for/to the UE by RRC (or DCI or MAC) signaling.

i. For the max COT duration, one value may be configured/indicated commonly for all FFP-u periods, for each FFP-u period, or for each FFP-u period set (i.e., each set of FFP-u periods). For example, a total of N FFP-u periods, FFP-u period #0 to FFP-u period #N−1 are assumed. For example, the same max COT duration may be configured commonly for FFP-u period #0 to FFP-u period #N−1. Alternatively, a max COT duration may be configured independently for each individual FFP-u period. Alternatively, an FFP-u period group/set-based max COT duration configuration/indication method may be used, such as configuration/indication of a first max COT duration for a first group of FFP-u periods and a second max COT duration for a second group of FFP-u periods among the total of N FFP-u periods.

B. As a UE operation in the remaining period except for the max COT duration in the former part of an FFP-u period (referred to as a "behavior after COT", for convenience), one of the following Alt 1 and Alt 2 (and/or Alt 3) may be configured for/indicated to the UE by RRC (or DCI or MAC) signaling, or one of the following Alt 1 and Alt 2 (and/or Alt 3) (e.g., Alt 2 (and/or Alt 3) may be defined (without any separate configuration/indication).

i. Alt 1: Only a shared-COT-based UL (e.g., PUSCH or PUCCH) transmission (based on a BS-initiated COT) is possible.

ii. Alt 2: No UL transmission is allowed.

iii. Alt 3: Only a UL (e.g., PUSCH or PUCCH) transmission scheduled by DCI is possible.

iv. Also in the case of the behavior after COT, one value may be configured/indicated commonly for all FFP-u periods, for each FFP-u period, or for each FFP-u period set (i.e., each set of FFP-u periods).

C. Additionally, when an FFP-u period includes the starting time of an FFP-g period, (a max COT duration may be configured/indicated as described above, or) the time period between the starting time of the FFP-u period and the starting time of the FFP-g period may be defined as the max COT duration without any separate configuration/indication.

i. In this case, the behavior after COT may be defined as Alt 1 (without any separate configuration/indication).

D. Alternatively, when an FFP-u period includes the starting time of an FFP-g period, it may be configured for/indicated to the UE whether Alt A) the time period between the starting time of the FFP-u period and the starting time of the FFP-g period is applied as the max COT duration or Alt B) this separate limitation is not imposed on a COT duration for transmission of the UE, by RRC (or DCI or MAC) signaling.

i. For example, Alt A may be performed as a default operation (until before a separate configuration/indication is made) and whether to perform Alt B may be configured/indicated. Alternatively, Alt B may be performed as a default operation (until before a separate configuration/indication is made) and whether to perform Alt A may be configured/indicated.

ii. Also in this case, the behavior after COT may be defined as Alt 1 (without any separate configuration/indication).

E. Additionally, when the FFP-u period does not include the starting time of the FFP-g period, the behavior after COT (after the configured/indicated max COT duration) may be defined as Alt 2 (and/or Alt 3) (without any separate configuration/indication).

3) The specific signaling indicating whether the UE-initiated COT is allowed may be configured/transmitted as UE (group)-common DCI or UE-specific (UL grant) DCI.

A. The DCI may explicitly indicate whether the FFP-n starts with the UE-initiated COT. When the DCI is UE (group)-common DCI, the DCI may indicate for each UE (group) individually or independently whether to allow generation of the UE-initiated COT at the starting time of the FFP-n (and/or information indicating (the number of) an FFP period for which the UE-initiated COT is allowed).

i. Alternatively, it may be implicitly indicated whether a configured UL resource configured at a specific time (e.g., a symbol/slot in the former part) in the FFP-n period is canceled (in this case, the UE-initiated COT is not allowed) or not (in this case, the UE-initiated COT is allowed).

B. And/or, a COT/FFP type scheduled/allowed in a subsequent (e.g., the immediately following) FFP period (e.g., whether an FFP-g transmission starting with a BS-initiated COT or an FFP-u transmission starting with a UE-initiated COT is scheduled) may be indicated by DCI (e.g., DCI format 2_0) indicating a COT duration and a slot format information (SFI) structure, transmitted in a specific (current) FFP period.

i. For example, in the case where a UE (group) combines a COT duration and SFI structure information corresponding to the UE (group) among the fields of the signaled DCI, and the SFI information includes a DL/UL configuration for a time period following the (ending time of) the current FFP period as a result of the combining, when SFI information indicated for the corresponding time period (a specific time point (e.g., the first symbol) in the time period) is DL (symbol), an FFP-g transmission starting with a BS-initiated COT may be scheduled (or an FFP-u transmission starting with a UE-initiated COT may not be allowed) in the next FFP period, and when the SFI information indicated for the corresponding time period is UL (symbol), an FFP-u transmission starting with a UE-initiated COT may be allowed in the next FFP period for the UE (group).

ii. Additionally, the SFI information of the DCI indicated for the time period is flexible (symbol), 1) either of an FFP-g transmission starting with a BS-initiated COT or an FFP-u transmission starting with a UE-initiated COT may not be scheduled/allowed in the next FFP period, or 2) only a scheduled PUSCH/PUCCH transmission (indicated by the DCI) may be allowed in the next FFP period, while a configured PUSCH/PUCCH transmission (configured in the FFP period) may not be allowed in the next FFP period.
    iii. In another method, when the SFI information of the DCI indicated for the time period is DL and/or flexible (symbol), an FFP-u transmission starting with a UE-initiated COT may not be allowed in the next FFP period, whereas when the SFI information of the DCI indicated for the time period is UL (symbol), an FFP-u transmission starting with a UE-initiated COT may be allowed in the next FFP period.
    iv. In another method, when the SFI information of the DCI indicated for the time period is DL (symbol), an FFP-u transmission starting with a UE-initiated COT may not be allowed in the next FFP period, whereas when the SFI information of the DCI indicated for the time period is UL and/or flexible (symbol), an FFP-u transmission starting with a UE-initiated COT may be allowed in the next FFP period.
  C. Alternatively, it may be indicated whether a non-UL (e.g., DL) or UL resource configured at a specific time (e.g., a symbol/slot in the former part) in the FFP-n period is overridden/confirmed as UL (in this case, a UE-initiated COT is allowed) or not (in this case, the UE-initiated COT is not allowed).
    i. In this case, the DCI may indicate an SFI. Herein, the DCI may indicate an SFI for an FFP configured after the transmitted FFP, and/or a single DCI may simultaneously indicate SFIs for a plurality of FFPs.
  D. Alternatively, it may be indicated whether a UL resource is allocated for scheduling a PUSCH transmission at a specific time (e.g., a symbol/slot in the former part) in the FFP-n period (in this case, a UE-initiated COT is allowed) or not (in this case, the UE-initiated COT is not allowed).
4) In another method, the BS may indicate to UEs whether a specific (e.g., the immediately following) FFP-g period is transmitted/used (through COT generation) by specific signaling in a period with its generated COT (an FFP-g period starting with the COT) (a shared-COT-based transmission in the period). The UE may receive the specific signaling in the period with the BS-generated COT (the FFP-g period starting with the COT) (the shared-COT-based transmission in the period) and determine whether the specific (e.g., the immediately following) FFP-g period is transmitted/used (through COT generation) based on the specific signaling.
  A. In an additional method, the UE may indicate to the BS (and other UEs) whether a specific (e.g., the immediately following) FFP-u period is transmitted/used (through COT generation) by specific signaling in a period with its generated COT (an FFP-u period starting with the COT) (a shared-COT-based transmission in the period).

[Proposal 3]

1) When a specific FFP starts with a UE-initiated COT-based transmission, all of configured UL (e.g., PRACH or PUSCH) resources configured in the FFP period may be determined to be valid UL resources (UL resources transmittable by the UE) (regardless of collision with DL).
  A. Additionally, (configured) DL resources may be overridden by UL in the FFP period starting with the UE-initiated COT. (Unlike this, UL resources may be overridden by DL (while DL resources may not be overridden by UL), as is done conventionally, in an FFP period starting with a BS-initiated COT.)
2) A UL/DL configuration applied to an FFP period starting with a UE-initiated COT (i.e., FFP-u period) and a UL/DL configuration applied to an FFP period starting with a BS-initiated COT (i.e., FFP-g period) may be configured independently (e.g., differently).

[Proposal 4]

1) According to an example of the present disclosure, a CP configuration/parameter may be determined for a UL signal depending on whether the start of an FFP-u is aligned with the start (symbol) of the UL signal. A first CP extension parameter value (e.g., extended CP length) may be configured/applied for CP extension applied to a UL signal (e.g., PUSCH/PUCCH/PRACH) resource transmission configured or scheduled to have a starting symbol aligned with the starting time of an FFP-u starting with a UE-initiated COT (and/or after a specific time or less from the starting time), and a second CP extension parameter may be configured/determined for a UL signal (e.g., PUSCH/PUCCH/PRACH) resource transmission configured or scheduled not to be aligned with the starting time of the FFP-u. The UE/BS may determine/apply the first CP extension parameter value and the second CP extension parameter value, independently (e.g., differently).
  A. For example, the following methods may be considered for a UL signal transmitted based on a configured grant or an RRC configuration, for example, a configured PUSCH (and/or PRACH and/or PUCCH).
    Opt 1: In the case where one CP extension parameter value is configured to be applied commonly to all configured PUSCH resources (or all configured PRACH/PUCCH resources), CP extension may be performed exceptionally for a PUSCH (PRACH/PUCCH) resource configured to be aligned with the starting time of an FFP-u, such that the starting time of the corresponding signal is accurately aligned with the starting time of the FFP-u.
    Opt 2: Individual/independent CP extension parameter values (e.g., extended CP lengths) may be configured for a configured PUSCH (PRACH/PUCCH) resource configured not to be aligned with the starting time of an FFP-u and a configured PUSCH (PRACH/PUCCH) resource configured to be aligned with the starting time of the FFP-u. (In further generalization, a CP extension parameter value (e.g., extended CP length) may be configured individually/independently for each configured PUSCH (PRACH/PUCCH) resource.
  B. In another example, the following methods may be considered for a UL signal transmitted based on dynamic UL/DL grant DCI, for example, a scheduled PUSCH (and/or PUCCH).
    Opt 1: In the case where a plurality of candidate CP extension parameter values (i.e., a candidate CPE value set) have been configured commonly for all scheduled PUSCH resources (or all scheduled PUCCH resources) (and one of the candidate CP extension parameter values is indicated by DCI), CP extension may be performed (by determining/applying an extended CP length) exceptionally for a PUSCH (PUCCH) resource indicated to be aligned with the starting time of an FFP-u, so that the starting time of the signal is accurately aligned with the starting time of the FFP-u.

Opt 2: Individual/independent candidate CPE value sets (e.g. extended CP lengths) may be configured for a scheduled PUSCH (PRACH/PUCCH) resource configured to be aligned with the starting time of an FFP-u and a scheduled PUSCH (PRACH/PUCCH) resource configured not to be aligned with the starting time of the FFP-u.

[Proposal 5]

1) When succeeding in detecting a specific signal transmitted from the UE in an FFP-u period (starting with a UE-initiated COT), the BS may also perform a shared-COT-based DL transmission in the same FFP-u period, and this shared-COT-based transmission from the BS may be allowed only until (shortly before) the starting time of the idle period configured in the FFP-u period (at maximum).

A. In this case, when the BS detects UL signals transmitted from a plurality of UEs in the FFP-u period, and the starting times of (a plurality of) idle periods configured for the UEs are set to be different, 1) the BS may be allowed to perform a shared-COT-based transmission until (shortly before) the earliest or last of the starting times of the idle periods or 2) until (shortly before) the starting time of an idle period configured for a UE that the BS schedules by transmitting DL/UL grant DCI in the FFP-u period.

2) For an FFP-u period starting with a UE-initiated COT, a portion occupied by the idle period in the FFP-u period or the starting/ending time of the idle period in the FFP-u period may be configured by RRC signaling or indicated by DCI/MAC signaling (without having a fixed value, like the existing FFP-g starting with a BS-initiated COT).

A. And/or, in the case where the network has configured an FFP-u starting time independently (e.g., differently) for each of a plurality of UEs, the starting time of the idle period in an FFP-u period may be set to be identical for all of the plurality of UEs.

[Proposal 6]

1) Various FFP types may be defined/configured according to the type of a DL/UL transmission signal/channel configured to have a starting symbol aligned with an FFP starting time (and/or after a specific time or less from the starting time) (and/or configured in an FFP period (without overlap with the idle period)). The various types may include all or at least one of three FFP types, a) a default FFP-g starting with a BS-initiated COT only, b) a default FFP-u starting with a UE-initiated COT only, and/or c) a flexible FFP that may start with one of a BS-initiated COT and a UE-initiated COT.

A. When a specific DL signal/channel (e.g., a broadcast SSB (e.g., resources for SS/PBCH transmission) and/or a specific transmission (configured by an MIB/SIB) (e.g., a CORESET (e.g., having a lowest ID/index)) transmission is configured at the starting time of a specific FFP or within the FFP period, the FFP may be defined/configured as the default FFP-g.

i. Therefore, for an FFP corresponding to the default FFP-g (and/or overlapping with the default FFP-g), an FFP-u configuration/transmission through UE-initiated COT generation may not be allowed (therefore, the UE may not perform an LBT operation shortly before the starting time of an FFP, for COT initiation), and only a shared-COT-based transmission in the FFP period may be allowed for the UE (therefore, the UE may first detect a DL signal transmitted from the BS in the FFP period).

B. When a specific UL signal/channel (e.g., PRACH) transmission is configured at the starting time of a specific FFP, the FFP may be defined/configured as the default FFP-u. For example, when the starting time of a specific FFP overlaps with a PRACH occasion, the FFP may be defined/configured as the default FFP-u.

i. Therefore, for an FFP corresponding to the default FFP-u (and/or overlapping with the default FFP-u), an FFP-g configuration/transmission through BS-initiated COT generation may not be allowed (therefore, the BS may not perform an LBT operation shortly before the starting time of an FFP, for COT initiation), and only a shared-COT-based transmission in the FFP period may be allowed for the BS (therefore, the BS may first detect a UL signal transmitted from the UE in the FFP period).

C. The other FFPs which are not defined/configured as the default FFP-g or the default FFP-u may be defined/configured as flexible FFPs.

i. These flexible FFPs may be flexibly configured/transmitted as FFP-g's or FFP-u's (over time) based on LBT results of the BS and the UE and/or the specific signaling and/or DL/UL grant DCI scheduling/indication.

2) In the case where a plurality of LBT-SBs (e.g., RB set (+guard RBs)) and/or a plurality of carriers have been configured for the UE, the following operations may be considered.

A. When (for a specific FFP period), at least one LBT-SB or at least one carrier is configured as the default FFP-g in an LBT-SB group including a plurality of LBT-SBs in one carrier (and/or a plurality of intra-band carriers), a carrier group including a plurality of intra-band carriers, or an LBT-SB group/carrier group for which availability is indicated by the same bit of a PDCCH, when availability is indicated for an LBT-SB/carrier by specific signaling (e.g., a GC-PDCCH), the UE may perform the Rel-16 operation, assuming an FFP-g transmission structure starting with a BS-initiated COT for all LBT-SBs/carriers in an LBT-SB group/carrier group to which the corresponding LBT-SB/carrier belongs (for the corresponding FFP period).

This example may be extended to a case in which the specific LBT-SB group includes a single LBT-SB and/or the specific carrier group (CG) includes a single carrier, not necessarily limited to a plurality of LBT-SBs/a plurality of carriers. For example, when default FFP-g's are configured in at least a part of the specific LBT-SB group (regardless of the number of LBT-SBs included in the specific LBT-SB group), the UE may perform the Rel-16 operation, assuming an FFP-g transmission structure starting with a BS-initiated COT for the entire specific LBT-SB group (for the corresponding FFP period). For example, when default FFP-g's are configured in at least a part of the specific CG (regardless of the number of carriers included in the specific CG), the UE may perform the Rel-16 operation, assuming the FFP-g transmission structure starting with the BS-initiated COT for the entire specific CG (for the corresponding FFP period).

i. Accordingly, a UL resource (e.g. a (CG) PUSCH, a PRACH, or a PUCCH) configured at the starting time of an FFP-u (included in a default FFP-g period and/or overlapping with the transmission time of a specific DL signal/channel) in LBT-SBs/carriers in the LBT-SB group/carrier group (to which an LBT-SB/carrier constructed/configured with default FFP-g's belong) may be canceled or processed as invalid, and/or only a shared-COT-based transmission based on a BS-initiated COT may be enabled/allowed for a UL resource (e.g., a PUSCH or PUCCH) configured or scheduled at the starting time of an FFP-u, and/or only a one-time transmission may be enabled/allowed (the BS is not allowed to perform a shared-COT-based DL transmission based on the corresponding transmission) for a UL resource configured/scheduled at the starting time of the FFP-u.

ii. Therefore, an FFP-u configuration/transmission through generation of a UE-initiated COT may not be allowed for an FFP assumed to be an FFP-g (the entire LBT-SB group/carrier group in the corresponding period) (or only a shared-COT-based transmission may be allowed in the corresponding FFP period for the UE). This may be intended to prevent the influence of (UL-to-DL) interference that the UE-initiated COT-based transmission causes to a BS-initiated COT/FFP. For example, collision/interference between a BS-initiated COT and a UE-initiated COT may be prevented.

B. Otherwise, when none of all LBT-SBs or all carriers in the LBT-SB group or the carrier group are configured with default FFP-g's, the UE may start a corresponding FFP-u transmission in a UE-initiated COT in LBT-SBs/carriers (all LBT-SBs/carriers or some LBT-SBs/carriers (for which the LBT result is idle)) in the LBT-SB group/carrier group.

C. The LBT-SB group/carrier group may be determined to be all of a plurality of LBT-SBs configured/constructed in one carrier (and/or a plurality of intra-band carriers) or a plurality of intra-band carriers, or may be determined as/limited to LBT-SBs/carriers in which the UE is to perform an actual UL channel/signal transmission or LBT-SBs/carriers configured/indicated for a UL channel/signal transmission from the UE, (for a corresponding FFP period). For example, when there are LBT-SB groups/carrier groups #0 to #N in the system, and the UE intends to perform a UL channel/signal transmission or is configured/indicated to perform a UL channel/signal transmission in some of LBT-SB groups/carrier groups #0 to #N (hereinafter, referred to specific LBT-SB group(s)/carrier group(s)), the UE may be allowed to start a corresponding FFP-u transmission in a UE-initiated COT based on the absence of the default FFP-g construction/configuration in the entire specific whole LBT-SB group(s)/carrier group(s).

D. In further generalization, to start an FFP-u transmission in a UE-initiated COT in the presence of LBT-SB groups/carrier groups #0 to #N in the system, at least some LBT-SB group(s)/carrier group(s) may be configured for/indicated to/determined for the UE, only when the absence of the default FFP-g construction/configuration is confirmed. For example, based on the absence of the default FFP-g construction/configuration being identified in some LBT-SB group(s)/carrier group(s), the UE may be allowed to start an FFP-u transmission in a UE-initiated COT, restrictively for some LBT-SB group(s)/carrier group(s) or for LBT-SB/carrier groups including the corresponding LBT-SB/carrier group(s). When the UE starts the FFP-u transmission in this manner, the LBT-SB/carrier group(s) may be defined to necessarily include a corresponding UL signal. For example, the LBT-SB/carrier group(s) may be configured or predefined cell-commonly/UE-group commonly.

Figure 18:
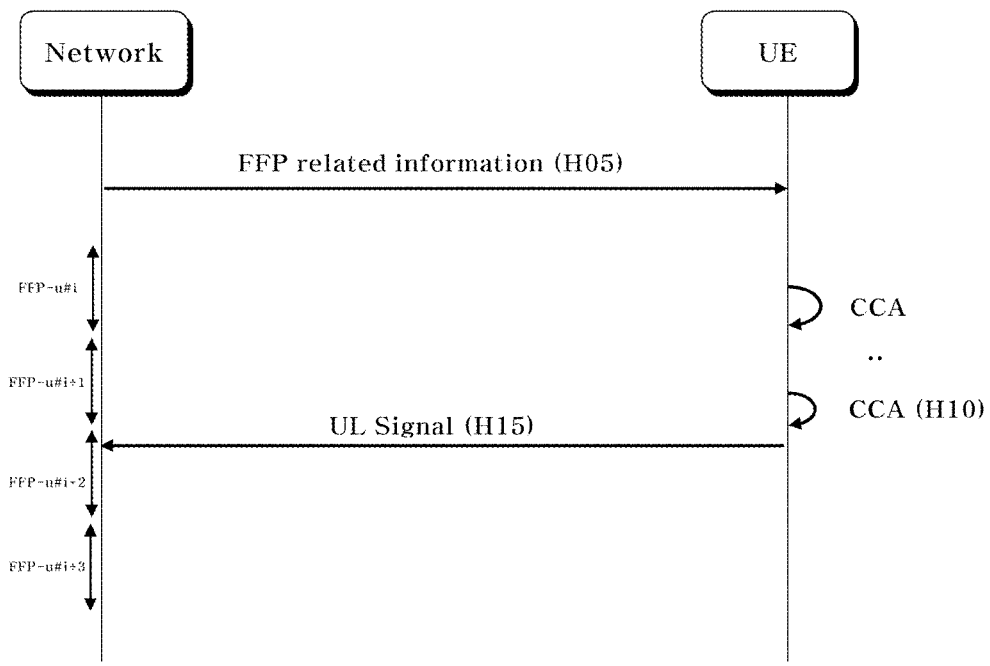
FIG. 18 is a diagram illustrating a signal flow for a frame based equipment (FBE)-based channel access method on a shared spectrum according to an embodiment of the present disclosure.

FIG. 18 is a diagram illustrating a method of performing a CAP on a shared spectrum by a UE in a wireless communication system according to an embodiment of the present disclosure. The embodiment of FIG. 18 is an exemplary application method of the foregoing proposal(s), which does not limit the scope of the disclosure. Further, the foregoing description may be referred to for the understanding of the embodiment of FIG. 18.

Referring to FIG. 18, a UE obtains FFP-related information for FBE (H05). The FFP-related information may include information about an FFP starting offset and information about an FFP duration/period.

For example, the FFP-related information may be obtained by higher-layer signaling. A BS may transmit the FFP-related information for FBE. The UE may identify the starting time of a corresponding FFP, based on the FFP starting offset having an OFDM symbol-level granularity. A maximum value of the FFP starting offset having the OFDM symbol-level granularity may be determined based on a length of the FFP duration/period. A first time length indicated by the information about the FFP starting offset may be set to be less than a second time length indicated by the information about the FFP duration/period. The BS may indicate the determined first time length based on the OFDM symbol-level granularity by the information about the FFP starting offset.

The UE may perform clear channel assessment (CCA) for at least one FFP starting with a UE-initiated channel occupancy time (COT) based on the FFP-related information (H10).

The UE transmits a UL signal in an FFP determined based on the CCA (H15). When the transmission may not be started, the UE may transmit the UL signal based on sharing a BS-initiated COT.

The BS may monitor a UL signal in each FFP starting with a UE-initiated COT based on the FFP-related information.

When the UE may not start its COT in a corresponding FFP due to channel-busy as a result of the CCA, the UE may transmit the UL signal based on sharing a BS-initiated COT.

At least one FFP starting with the UE-initiated COT may be a first-type FFP, and an FFP starting with the BS-initiated COT may be a second-type FFP different from the first-type FFP. The start of the first-type FFP may not be time-aligned with the start of the second-type FFP. The start of an idle period included in the first-type FFP may be time-aligned with the start of an idle period included in the second-type FFP.

Figure 19:
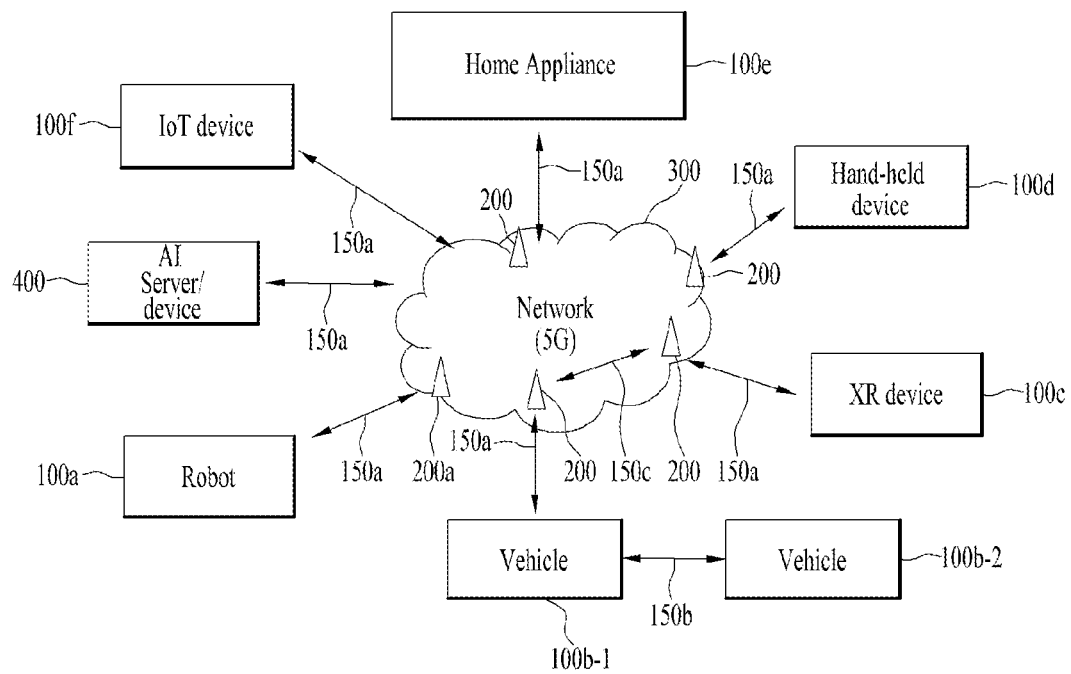
FIGS. 19 to 22 are diagrams illustrating an exemplary communication system 1 and exemplary wireless devices, applied to the present disclosure.

FIG. 19 illustrates a communication system 1 applied to the present disclosure.

Referring to FIG. 19, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
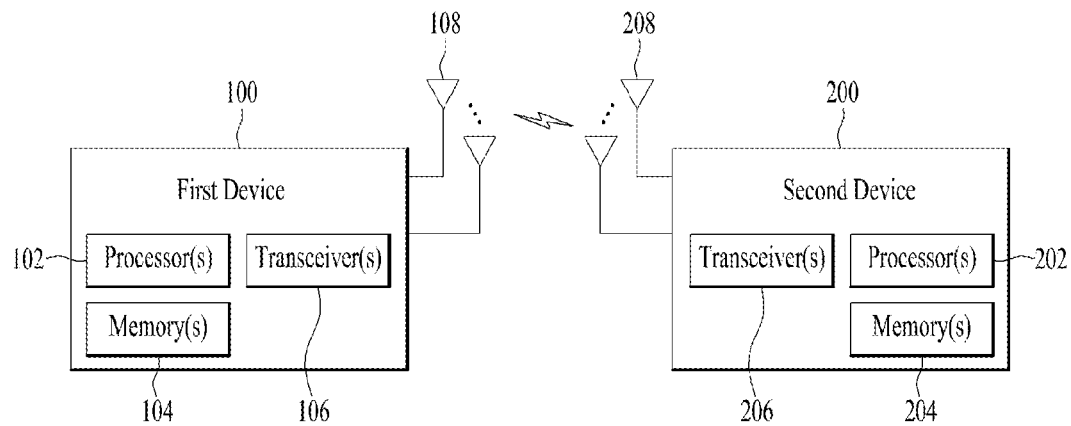

FIG. 20 illustrates wireless devices applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
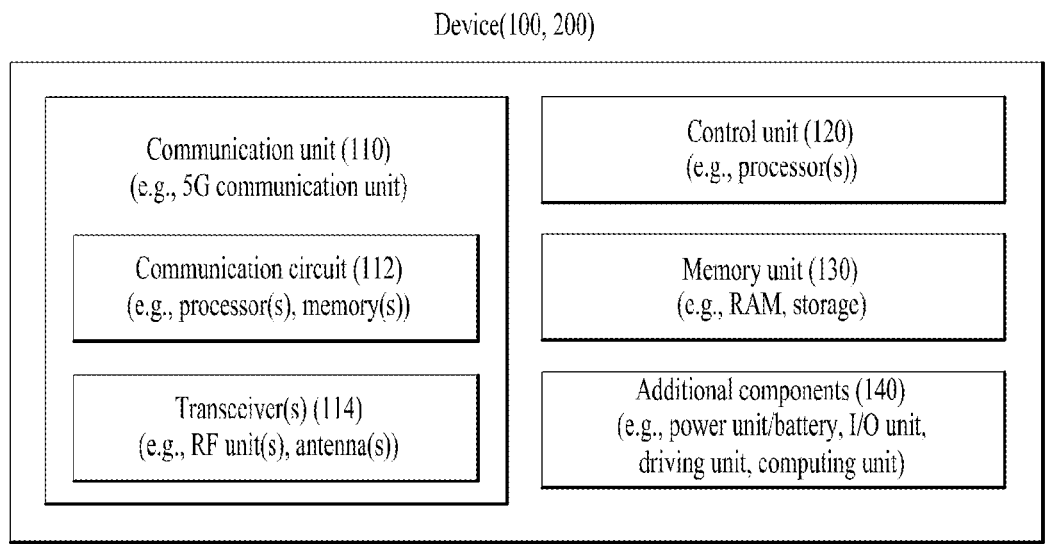

FIG. 21 illustrates another example of a wireless device applied to the present disclosure. The wireless device may be implemented in various forms according to a use-case/service (refer to FIG. 19).

Referring to FIG. 21, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 22:
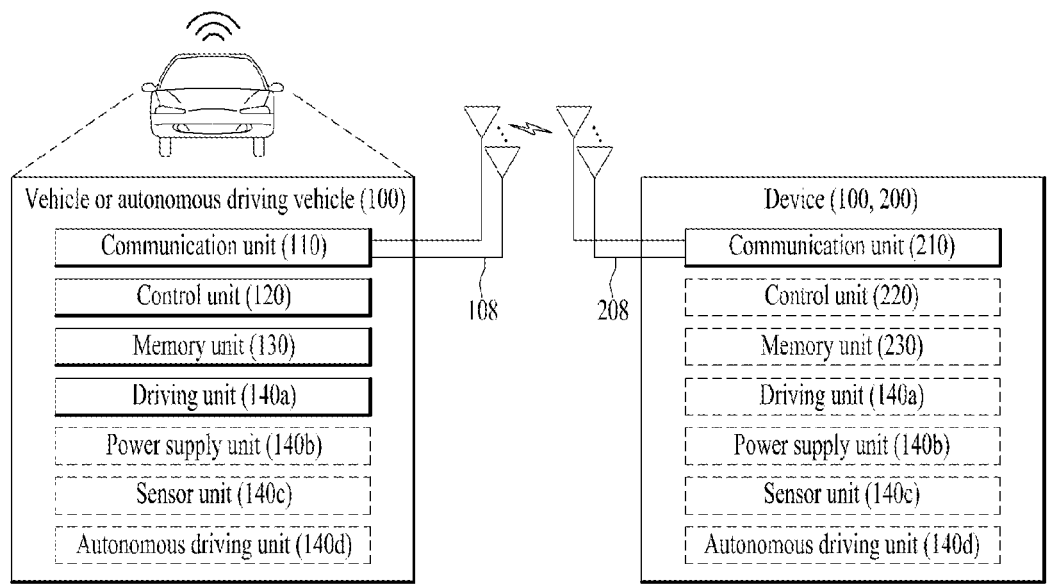

FIG. 22 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 23:
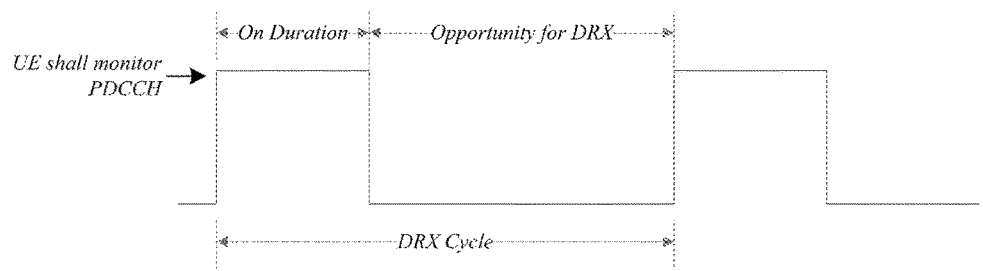
FIG. 23 is a diagram illustrating an exemplary discontinuous reception (DRX) operation applicable to the present disclosure.

FIG. 23 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 23, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 9 describes a DRX operation of a UE (in the RRC_CONNECTED state). Referring to Table 9, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 9

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, BSs, or other apparatuses in a wireless mobile communication system.

What is claimed is:

1. A method of performing a channel access procedure on a shared spectrum by a user equipment (UE) in a wireless communication system, the method comprising:
   receiving, in a first period for a base station (BS)-initiated channel occupancy, downlink control information (DCI) for a scheduled uplink (UL) transmission, and
   performing a channel access procedure for the scheduled UL transmission associated with a UE-initiated channel occupancy,
   wherein i) the scheduled UL transmission is entirely confined in the first period for the BS-initiated channel occupancy and ii) the scheduled UL transmission is not time-aligned with a beginning of a second period for the UE-initiated channel occupancy, and
   wherein:
      the UE performs the scheduled UL transmission based on that the UE has already initiated a channel occupancy in the second period, and
      the UE drops the scheduled UL transmission based on that the UE has not initiated the channel occupancy in the second period.

2. The method of claim 1, wherein the UE does not perform the scheduled UL transmission without initiating the channel occupancy in the second period.

3. The method of claim 1, wherein the scheduled UL transmission occurs after the beginning of the second period.

4. The method of claim 1, wherein the scheduled UL transmission is included in the second period.

5. The method of claim 1, further comprising:
   receiving configuration information regarding the first period and the second period.

6. The method of claim 5, wherein the configuration information is received via higher layer signaling.

7. The method of claim 1, wherein a beginning of the first period is not time-aligned with the beginning of the second period.

8. A non-transitory computer-readable medium storing a program for performing the method of claim 1.

9. A device for wireless communication, the device comprising:
   a memory configured to store instructions; and
   a processor configured to perform operations by executing the instructions, the operations comprising:
      receiving, in a first period for a base station (BS)-initiated channel occupancy, downlink control information (DCI) for a scheduled uplink (UL) transmission on a shared spectrum, and
      performing a channel access procedure for the scheduled UL transmission associated with a device-initiated channel occupancy, wherein, i) the scheduled UL transmission is entirely confined in the first period for the BS-initiated channel occupancy and ii) the scheduled UL transmission is not time-aligned with a beginning of a second period for the device-initiated channel occupancy, and wherein:
the processor performs the scheduled UL transmission based on that the device has already initiated a channel occupancy in the second period, and
the processor drops the scheduled UL transmission based on that the device has not initiated the channel occupancy in the second period.

10. The device of claim 9, further comprising:
a transceiver configured to transmit or receive a wireless signal under control of the processor,
wherein the device is a user equipment (UE) configured to operate in a wireless communication system.

11. The device of claim 9, wherein the device is an application specific integrated circuit (ASIC) or a digital signal processing device configured control a user equipment (UE) to operate in a wireless communication system.

12. A method of receiving a signal on a shared spectrum by a base station (BS) in a wireless communication system, the method comprising:
transmitting, to a user equipment (UE) in a first period for a B S-initiated channel occupancy, downlink control information (DCI) for a scheduled uplink (UL) reception, and
performing the scheduled UL reception associated with a UE-initiated channel occupancy,
wherein i) the scheduled UL reception is entirely confined in the first period for the B S-initiated channel occupancy and ii) the scheduled UL reception is not time-aligned with a beginning of a second period for the UE-initiated channel occupancy, and wherein:
the BS performs the scheduled UL reception based on that the UE has already initiated a channel occupancy in the second period, and
the BS drops the scheduled UL reception based on that the UE has not initiated the channel occupancy in the second period.

13. A base station (BS), the BS comprising:
a transceiver; and
a processor configured to control the transceiver to:
transmit, to a user equipment (UE) in a first period for a BS-initiated channel occupancy, downlink control information (DCI) for a scheduled uplink (UL) reception on a shared spectrum, and
perform the scheduled UL reception associated with a UE-initiated channel occupancy,
wherein i) the scheduled UL reception is entirely confined in the first period for the B S-initiated channel occupancy and ii) the scheduled UL reception is not time-aligned with a beginning of a second period for the UE-initiated channel occupancy wherein:
the processor performs the scheduled UL reception based on that the UE has already initiated a channel occupancy in the second period, and
the processor drops the scheduled UL reception based on that the UE has not initiated the channel occupancy in the second period.

* * * * *